United States Patent
Wu

(10) Patent No.: US 7,315,496 B2
(45) Date of Patent: Jan. 1, 2008

(54) MEMORY MANAGE METHOD FOR DEFECT MANAGEMENT OF AN OPTICAL DISK

(75) Inventor: Tse-Hong Wu, Tai-Nan (TW)

(73) Assignee: MediaTek Inc., Hsin-Chu (TW)

( * ) Notice: Subject to any disclaimer, the term of this patent is extended or adjusted under 35 U.S.C. 154(b) by 102 days.

(21) Appl. No.: 10/249,365

(22) Filed: Apr. 3, 2003

(65) Prior Publication Data

US 2004/0013061 A1 Jan. 22, 2004

(30) Foreign Application Priority Data

Jul. 18, 2002 (TW) .............................. 91116057 A

(51) Int. Cl.
*G11B 7/00* (2006.01)

(52) U.S. Cl. ................. 369/47.14; 369/53.17

(58) Field of Classification Search ............ 369/47.14, 369/53.15, 53.16, 53.17, 54

See application file for complete search history.

(56) References Cited

U.S. PATENT DOCUMENTS

| | | | | |
|---|---|---|---|---|
| 5,237,553 A | * | 8/1993 | Fukushima et al. | 369/53.17 |
| 5,319,627 A | * | 6/1994 | Shinno et al. | 369/53.17 |
| 5,508,989 A | * | 4/1996 | Funahashi et al. | 369/53.16 |
| 5,844,911 A | * | 12/1998 | Schadegg et al. | 714/710 |
| 5,914,928 A | * | 6/1999 | Takahashi | 369/47.14 |
| 6,034,831 A | * | 3/2000 | Dobbek et al. | 360/53 |
| 6,430,127 B1 | * | 8/2002 | Tsukihashi | 369/47.33 |
| 6,728,899 B1 | * | 4/2004 | Ng et al. | 714/8 |
| 6,738,924 B1 | * | 5/2004 | Williams et al. | 714/7 |

* cited by examiner

*Primary Examiner*—Wayne Young
*Assistant Examiner*—Lixi Chow
(74) *Attorney, Agent, or Firm*—Winston Hsu

(57) ABSTRACT

A method for accessing data of an optical disk with a disk drive. The drive includes a memory; the optical disk has a plurality of data blocks for recording data and a plurality of spare blocks for replacing defect data blocks. While reading data recorded on the optical disk, a predetermined number of data blocks are read, then spare blocks for replacing defect data blocks among the predetermined number of data blocks are read. While writing data onto the optical disk, a predetermined number of data blocks are written, then data written in defect blocks among the predetermined number of defect blocks are written in corresponding spare blocks. The predetermined numbers are determined by a memory capacity of the memory, or a progress of the reading or writing.

7 Claims, 39 Drawing Sheets

(Write process)

(Read process)

(Write process)

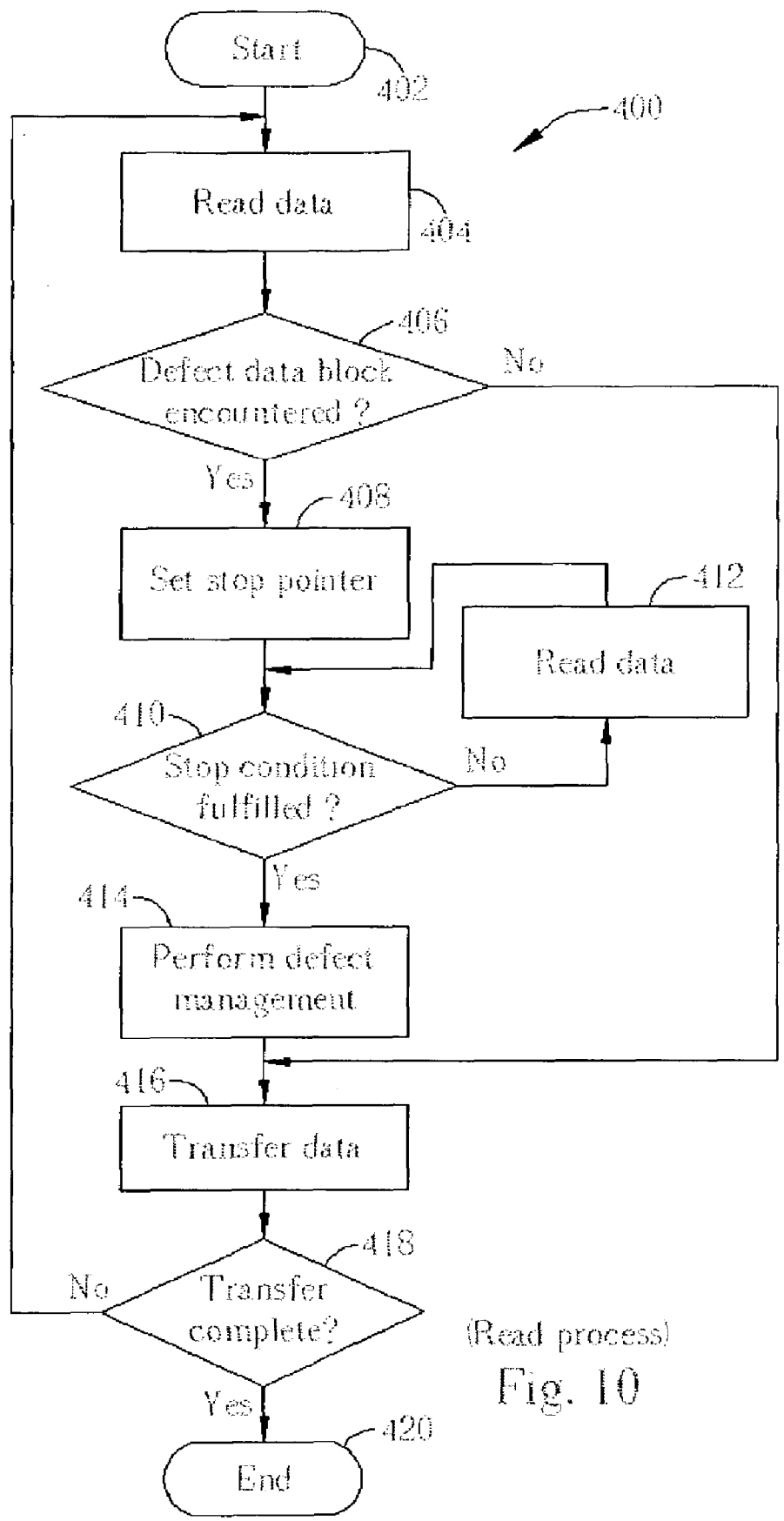
Fig. 10 (Read process)

MEMORY MANAGE METHOD FOR DEFECT MANAGEMENT OF AN OPTICAL DISK

BACKGROUND OF INVENTION

1. Field of the Invention

The present invention relates to optical data storage, and more specifically, to a method of defect management while accessing data on optical disks.

2. Description of the Prior Art

For their relatively low price, small volume, and light weight, optical disks can store huge amounts of information. Optical disks are now one of the most frequently used data storage media. Writable optical disks allow users to conveniently write personal data making optical disks one of the most important portable personal storage media. How to make data access in writable optical disks more reliable and more efficient is becoming a focal point of research in modern information industry.

An optical disk drive is needed to access data on the optical disk. Please refer to FIG. 1. FIG. 1 is a functional block diagram of a prior art optical disk drive 10 that is used to access an optical disk 22. The optical disk drive 10 further comprises a disk loader 14, a motor 12 that drives the disk loader 14 to spin, a pickup head 16 to access data on the optical disk 22, a control circuit 18 that controls the operation of optical disk drive 10 and a memory 20 (such as a volatile random-access memory) to temporarily hold data needed for control circuit 18 during operation. The optical disk 22 includes track 24 to record data. After the optical disk 22 is put onto the disk loader 14, the motor 12 drives the optical disk 22 to spin. The track 24 on the optical disk 22 spins as the optical disk 22 rotates and sweeps across the pickup head 16, such that the control circuit 18 can access the data on the track 24 via the pickup head 16. The control circuit 18 is controlled by a host 26, such as a computer system, to access the data on the optical disk 22.

To make the function of optical disk data recording more reliable, there are certain defect management mechanisms in the more advanced optical disk specifications. One of the most common is to allocate certain sections as spare record areas. When there are defects on the optical disk that makes recording impossible, the data can be recorded on the spare record area so the data recording function of optical disk is not affected by such defects. Please refer to FIG. 2A and FIG. 2B. FIG. 2A and FIG. 2B are schematic diagrams of spare record area and normal record area allocation in two different kinds of optical disk specification. FIG. 2A is the allocation under the Compact Disk-Mount Rainier reWritable (CD-MRW) specification, and FIG. 2B is for Digital Versatile Disk (DVD).

As shown in FIG. 2A, track 24 is used for data recording and is divided into several major sectors, namely, a Lead-In Area (LI), a Program Area (PA), and a Lead-Out Area (LO). The Lead-In Area (LI) and Lead-Out Area (LO) are used for marking the beginning and end of the track 24 respectively; and the Program Area (PA) is used to record data. One region of the Lead-In Area (LI) is separated to act as a Main Table Area (MTA), a Defect Table (DT) being stored in this region. The PA is further divided into a pre-gap (P0), a General Application Area (GAA), Secondary Table Area (STA) to store a backup copy of a defect record table, and a plurality of Spare Areas (SA). In FIG. 2A, different data areas (DA) are marked from SA(1), SA(2), to SA(N). All Data Areas (DA) are further divided into a predetermined number of Packets (Pd), each Packet (or so-called Data Packet Area) Pd having a plurality of user data blocks (Bd), and each Data Blocks Bd being used to record one data entry. Similarly, each spare area SA(n) is further divided into a predetermined number of Packets (Ps), each Packet (or so-called Spare Packet) having a plurality of spare data blocks (Bs). Data blocks (Bd) and spare blocks (Bs) are all writable data blocks with equivalent data storage capacity. For instance, in the CD-MRW specification, one Data Area (DA) has 136 packets (Pd), and every packet (Pd) has 32 user data blocks (Bd); and one Spare Area (SA) has 8 packets (Ps), and every packet (Ps) has 32 spare blocks (Bs). Every user data block (Bd) and spare block Bs is used to record 2 kilobytes of data. As shown in FIG. 2A, track 24 spins as the optical disk rotates over the pickup head 16. Relatively speaking, the pickup head 16 will sequentially pass through every block on the track 24 (including data blocks and spare blocks). For instance, when the pickup head 16 follows the arrow A1 in FIG. 2A and sweeps across track 24, it will first pass all the spare blocks on Spare Area SA(1), and then pass all data blocks on Data area DA(1) sequentially, and then pass another Spare Area SA(2), and so on.

According to similar principals of allocation, in the specification of DVD+MRW in FIG. 2B, track 24 also has a Lead-In Area (LI2) to mark the beginning of the track, a data zone (DZ) to record data, and a Lead-Out Area (LO2) to mark the end of the track. The Lead-In Area (LI2) has a Main Table Area (MTA2) to store a Defect Table. The Data area (DZ) is further divided into a General Application Area (GAA2), a Secondary Table Area (STA2) that is used to store the backup of the Defect Table, a User Data Area (UDA), and two Spare Areas (SA1) and (SA2). Similarly, the User Data Area (UDA) has a plurality of data blocks (BdO) (e.g. 139218 ECC blocks). Spare Areas (SA1), (SA2) also have a plurality of spare blocks (BsO) (e.g. 256 and 3840 ECC blocks respectively).

The basic principals of defect management are the same, no matter which data format is used (FIG. 2A or FIG. 2B) for the optical disk 22. Whenever the optical disk drive 10 is required to write data from the host 26 (refer to FIG. 1) to the optical disk 22, it will first write the data into a data block of the track 24. If a defect is encountered and it is impossible to record data into the data block correctly, the optical disk drive will find a substitute spare block and write data that was meant to be in the defect data block into this substitute spare block. In practical operation, each spare block and data block has its own address (such as a PBN, Physical Block Number). For a defect data block and a corresponding spare block to substitute for this defect data block, both addresses and their correlation are recorded in the defect table on the optical disk 22. When the optical disk drive 10 is required to read data from this optical disk, once it reaches the defect data block, it will first determine the corresponding substitute spare block via the record in defect table, and then read the data in this substitute spare block. According to the operational principle described above, even with some defects on the optical disk (probably caused by scratches or dust), by setting up and using spare blocks to implement defect management via a defect table, one can still maintain the data recording function of the optical disk 22.

Please refer to FIG. 3. FIG. 3 is a flowchart of a data write process 100 for a prior art optical disk. In order to perform the defect management described above when writing data onto an optical disk, the prior art process 100 uses these steps:

Step 102: Begin the data write process 100;

Step 104: The optical disk drive 10 receives a write instruction from the host 26 to write data transferred from the host 26 onto the optical disk 22. The host 26 will specify which data block on the optical disk 22 to write to;

Step 106: Receive data transferred from the host 26, temporarily store it in the memory 20, and start to record the data in the memory 20 onto the track 24 of the optical disk 22;

Step 108: If defect data blocks are encountered during the write process in step 106, further write work should be suspended, go to step 110 to perform defect management; if no defect data blocks are encountered, continue to step 112. The optical disk drive 10 can reference the Defect Table to see if defect data blocks are encountered;

Step 110: Perform defect management, writing data into substitute spare blocks.

In step 108, when one defect data block is encountered, the optical disk drive 10 can reference the Defect Table to find out the address of the spare block corresponding to this defect data block. The optical disk drive 10 can control the pickup head 16 and reference the address to move to corresponding position of the spare block, and write data into this spare block;

Step 112: If all the data transferred from the host 26 is written onto the optical disk 22, proceed to step 114; if not, go back to step 106;

Step 114: End of the prior art optical disk data write process 100.

For further information on the prior art process 100 as described above, please refer to FIG. 4A through FIG. 4E. FIG. 4A to FIG. 4E are schematic diagrams of the prior art process 100 in action, specifically, the related data allocation of the optical disk 22 and the memory 20 of the optical disk drive 10. If the host 26 requires the optical disk drive 10 to start writing data into data packet Pd1 (having data blocks Bd1a, Bd1b, Bd1c . . . ), packet Pd2 (having data blocks Bd2a, Bd2b, Bd2c . . . ), packet Pd3, etc, process 100 commences. In FIG. 4A, the host 26 starts to transfer data (to be written to the optical disk 22) to the optical disk drive 10, and the optical disk drive 10 temporarily stores this data in the memory 20. The optical disk drive 10 allocates a memory space 28 with a section of fixed memory capacity. The memory space 28 has a plurality of memory units 28u, each memory unit 28u being used to temporarily store one entry of data that is going to be written to the data block (for simplified explanation, two memory units are marked 28u1 and 28u2 respectively). When the host 26 issues a write instruction to optical disk drive 10 (step 104), the host 26 sequentially transfers data to be written to the optical disk 22 to memory 20 (step 106), and the memory 20 also temporarily stores the data in one memory unit 28u. A transfer pointer (TA) in FIG. 4A to FIG. 4E is used to mark the progress of the data transfer of the host 26. Referring to FIG. 4A, when the host 26 is required to transfer data in the corresponding data block Bd1a to the memory 20, the transfer pointer Ta points to the memory unit 28u1, and temporarily stores this data in the memory unit 28u1. Next, the transfer pointer Ta points to the memory unit 28u2 sequentially, and the host 26 transfers the data, which is supposed to be written to the data block Bd1b, to memory 20, and then references the instruction of the transfer pointer Ta to temporarily store the data in the memory unit 28u2. When the host 26 transfers data that is supposed to be written to data blocks Bd1a, Bd1b, Bd1c to the memory 20 sequentially, the transfer pointer Ta shifts accordingly, pointing to different memory units and reaching the position shown in FIG. 4A. Based on a similar principle, the optical disk drive 10 follows a Write Pointer Tb to write data in every memory unit of the memory 20 into data blocks of the optical disk drive 22. In FIG. 4A, it is supposed that the host has not started writing data into tracks 24 of optical disk 22, so the write pointer Tb still points to the memory unit 28u1.

Referring to FIG. 4B, the pickup head 16 starts to write data into the corresponding data blocks of the track 24. As data in the memory units is sequentially written into the track 24, the write pointer Tb points to the next memory unit that stores data. As data is written into the data blocks Bd1a, Bd1b, Bd1c the write pointer Tb points to the different memory units 28u1, 28u2, etc accordingly. Data that has been written into the corresponding data blocks can now be released by the memory 20, so the memory space that stores this data can be recycled. As shown in FIG. 4B, data temporarily stored in the memory units 28u1 and 28u2 will be released after it is written into the data blocks Bd1a and Bd1b, so the data in the memory units can be overwritten afterwards. In the meantime, the host 26 continues to transfer data that is supposed to be written into the data blocks Bd2a, Bd2b, to Bd1c into the memory space 28, and the position that transfer pointer Ta points to changes accordingly. When data is written into data blocks Bd1a, Bd1b, to Bd1c, if there are no defects in the data blocks of the optical disk 22 and data can be recorded correctly, and the process 100 can continue smoothly.

Referring to FIG. 4C, with the progression of the write process, originally started in FIG. 4B where the write pointer points to a memory unit that temporarily stores data for the data block Bd1c, the write pointer has advanced to the memory unit that temporarily stores data for the data block Bd2b. In the meantime, the host 26 keeps on transferring data that is supposed to be written onto the optical disk 22 to the memory 20, and this also advances the transfer pointer Ta to point to a different memory unit (such as the memory unit that temporarily stores data that is supposed to be written to data block Bd3b). Suppose, on the track 24, the data block Bd2b is a defect data block, and the spare block substituted for this defect data block Bd2b to record data belongs to the spare block Bs1b of spare packet Ps1. After encountering the defect data block Bd2b, the prior art process 100 suspends the writing process. As shown in FIG. 4D, after encountering the defect data block Bd2b, the prior art process 100 proceeds from step 108 to step 110, and lets the pickup head 16 seek the position of the corresponding spare block Bs1b, and write the data that is supposed to be written into the defect data block Bd2b into the spare block Bs1b. In practice, the optical disk drive 10 will first read every spare block of the spare packet Ps1 into memory 20 and add the data of data block Bd2b into this spare packet Ps1, then write all the spare blocks of this spare packet Ps1 to the track 24. In FIG. 4E, the pickup head 16 seeks and returns to where it was interrupted, and continues to step 106 to write the remaining data into data block of the track 24 (e.g. write data to data block Bd3a, etc).

As shown in the optical disk specification in FIG. 2A or FIG. 2B, areas of accumulated spare block allocation (e.g. Spare areas SA or SA1, SA2) and areas of accumulated data block allocation (e.g. data areas or user data areas UDA) are interlaced with each other on track 24, so if the pickup head 16 shifts from an original position that corresponds to data blocks to a position corresponding to spare blocks, it will have to travel a relatively long distance taking much time. From the process described above, we know that during optical disk data write, the prior art process 100 uses the pickup head 16 to seek and cross over multiple packets in order to perform necessary spare block data writing (only in this way can defect management for defect data blocks be implemented), and afterwards seeking back to where it was interrupted and continuing further data writing into data blocks. Supposing that a plurality of defect data blocks were encountered during continuous data write, the prior art process 100 described above will be busy seeking in order to perform individual defect management for each defect data block. This will lower the efficiency of the optical disk data write of the prior art process 100, and increase the operational burden for actuating mechanisms of the pickup head 16, causing it to wear out easily.

Corresponding to the optical disk data writing process 100, there is also a process for optical disk data reading in the prior art. Please refer to FIG. 5. FIG. 5 is a flowchart of a process 200 used to perform defect management during optical disk data reading. The following steps are in the process 200:

Step 202: Start. When the host 26 requests the optical disk drive 10 to start to data read, the process 200 begins. The host 26 notifies the optical disk drive 10 regarding which data in the data blocks needs to be read;

Step 204: The optical disk drive 10 reads data from the optical disk 22. Data that is supposed to be read into the optical disk drive is first stored in the memory 20 temporarily;

Step 206: If defect data blocks are encountered during the read process, go to step 208; otherwise continue to step 210. Based on the Defect Table of the optical disk, the optical disk drive can judge if the data blocks encountered during the read process are defect data blocks or not;

Step 208: Perform defect management. In step 206, if it is time to read the defect data block, based on the Defect Table, the optical disk drive can locate the address of the spare block used to substitute this defect data block, and according to this address, the pickup head 16 will seek the corresponding location of the spare block, and read the data recorded in this spare block for defect management;

Step 210: Transfer the data temporarily stored in the memory to the host 26 to meet the read request of the host 26. If the process 200 comes to this step via step 206, 208, it means that defect data blocks were encountered during the read process, and the optical disk drive is not able read the data recorded in these defect data blocks. However, since in step 210, defect management has been performed and the correct data in this defect data block was read from a corresponding spare block, the correct data can be transferred to the host 26;

Step 212: If data transfer is complete, continue to step 214; if not yet finished transferring all the data requested by the host 26 to the host 26, go back to step 204;

Step 214: End.

For more information on the prior art process 200 described above, please refer to FIG. 6A through FIG. 6D. FIG. 6A to FIG. 6D show the related data allocation on track 24 and the memory 20 in different time frames when the process 200 reads data from the optical disk. Referring to FIG. 4A through FIG. 4E, if the host 24 requests the optical disk drive 10 to read the data in packets Pd1 to Pd3, the process 200 begins. Similar to the data write process of the optical disk described above, when reading data on the optical disk, data read by optical disk drive 10 is temporarily stored in a memory space 29 having a fixed memory capacity. The memory space 29 has a plurality of memory units 29u (for convenience marked 29u1 and 29u2), each used to temporarily store one data entry from the memory block. Similarly, the read pointer Td in FIG. 6A to FIG. 6D points to a memory unit used to temporarily store the data read by the pickup head 16. The memory units having data to transfer to the host 26 are pointed to by transfer pointer Tc. As shown in FIG. 6A, as the pickup head 16 starts to sequentially read data blocks such as Bd1a, Bd1b, etc on track 24, the read pointer Td sequentially points to the memory units 29u1, 29u2 and temporarily stores the data read from blocks Bd1a, Bd1b by pickup head 16 into memory units 29u1, 29u2. When the pickup head 16 reads the data in the data block Bd1c, the memory unit that the read pointer Td points to is as shown in FIG. 6A. In FIG. 6A, the data read from the track 24 in the memory space 29 has not yet been transferred to the host 26, so the transfer pointer Tc still points to the memory unit 29u1.

As shown in FIG. 6B, as the process 200 progresses, the pickup head 16 keeps reading data from the track 24, the read pointer Td advances accordingly and sequentially points to different memory units, and the data read by pickup head 16 is stored in the memory space 29 temporarily. Meanwhile, the optical disk drive 10 starts to transfer data in the memory space 29 to the host 26, so the host 26 can receive the data it requested. As the transfer pointer Tc points to the memory units 29u1, 29u2, data read from data blocks Bd1a, Bd1b and stored temporarily in the memory units 29u1, 29u2 (please also refer to FIG. 6A) will also be transferred to the host 26. After the optical disk drive 10 has finished transferring data from the data block Bd1d in the memory space 29 to the host 26, the memory unit that transfer pointer Tc points to is as shown in FIG. 6B. The memory unit with content transferred to the host 26 can be released, so new data can be written to this memory unit. For instance, memory units 29u1, 29u2 in FIG. 6B are released for other data because their temporary content has been transferred to the host 26. As the read pointer Td and the transfer pointer Tc advance, the process 200 performs step 204 and step 210 continuously. In FIG. 6C, the process 200 has encountered defect data block Bd2b. If the spare block to substitute for the defect data block Bd2b is spare block Bs1b in the spare packet Ps1, the optical disk drive 10 suspends further data reading, and moves pickup head 16 across track 24 to the position corresponding to spare block Bs1b, and begins step 208, reading in the data in block Bs1b and adding it to memory space 29. As shown in FIG. 6D and step 208, after the data in spare block Bs1b is read, the pickup head 16 moves across the track 24 and returns to where it was interrupted and continues further data access. The read pointer Td and the transfer pointer Tc also continue to advance, reading data on the track 24 to the memory space 29, and transferring the data in the memory space 29 back to the host 26.

From the above description of the data read process for the prior art optical disk, we know that in the prior art, every defect data block encountered suspends the continuous reading process. This is to allow the pickup head 16 to move across the track 24 and read the corresponding spare block for the defect data block to implement defect management for the defect data block. Subsequently, the pickup head 16 has to seek and return to where it was interrupted and continue further data reading. If there are numerous of defect data blocks on the optical disk, the prior art described above must frequently interrupt the reading process and perform defect management for every individual defect data block. In this way, efficiency of data access for the optical disk is sacrificed. Furthermore, when combining the processes 100, 200 for the prior art optical disk to read and write data, defect management is based on individual defect data blocks. This not only hampers the efficiency of the processes of data reading and writing, but also increases the mechanical wear to the optical disk drive through unnecessary pickup head mechanical movement.

SUMMARY OF INVENTION

It is therefore a primary objective of the present invention is to provide a method of optical disk data access that accumulates related defect management for multiple defect data blocks, reduces seek movement needed for defect management, boosts the efficiency of data access of the optical disk, and rectifies the shortcomings of the prior art.

In prior art, both the data read and write processes of optical disk are based on individual defect data blocks when performing defect management. Thus, the efficiency of optical disk data read write is reduced, and the burden to and wear out of mechanical components is increased.

In the present invention, individual defect data blocks encountered are not taken into account during the process of optical disk data reading and writing until the memory space allocated for optical disk drive data access is fully utilized, or the pickup head reaches the border of a data block and a spare block that requires a seek operation. Only at this point, related defect management is performed for all defect data blocks encountered during the process. This dramatically reduces time and mechanical operation required for performing defect management on individual defect data blocks. Interruption and redundant mechanical operation caused by defect management in optical disk data access are minimized, and the efficiency of data access of the optical disk can be improved.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 10 is a flowchart of an optical disk data read process for the optical disk drive of FIG. 7.

FIGS. 11A to 11K are schematic diagrams of related data allocation during the process of FIG. 10.

DETAILED DESCRIPTION

Figure 2A:
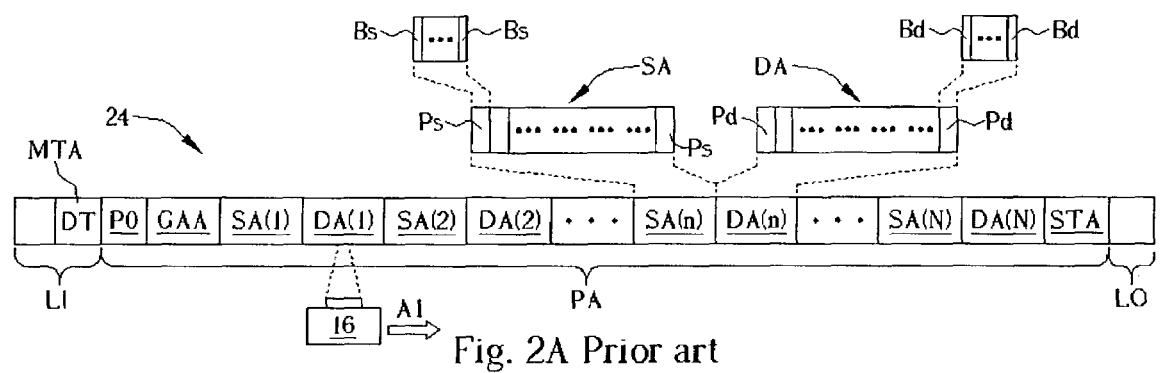
FIG. 2A and FIG. 2B are schematic diagrams of two kinds of optical disk data format allocation.
Figure 2B:
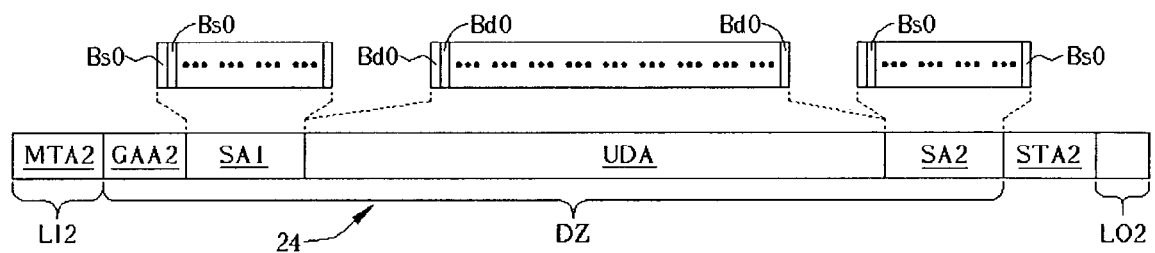
Figure 3:
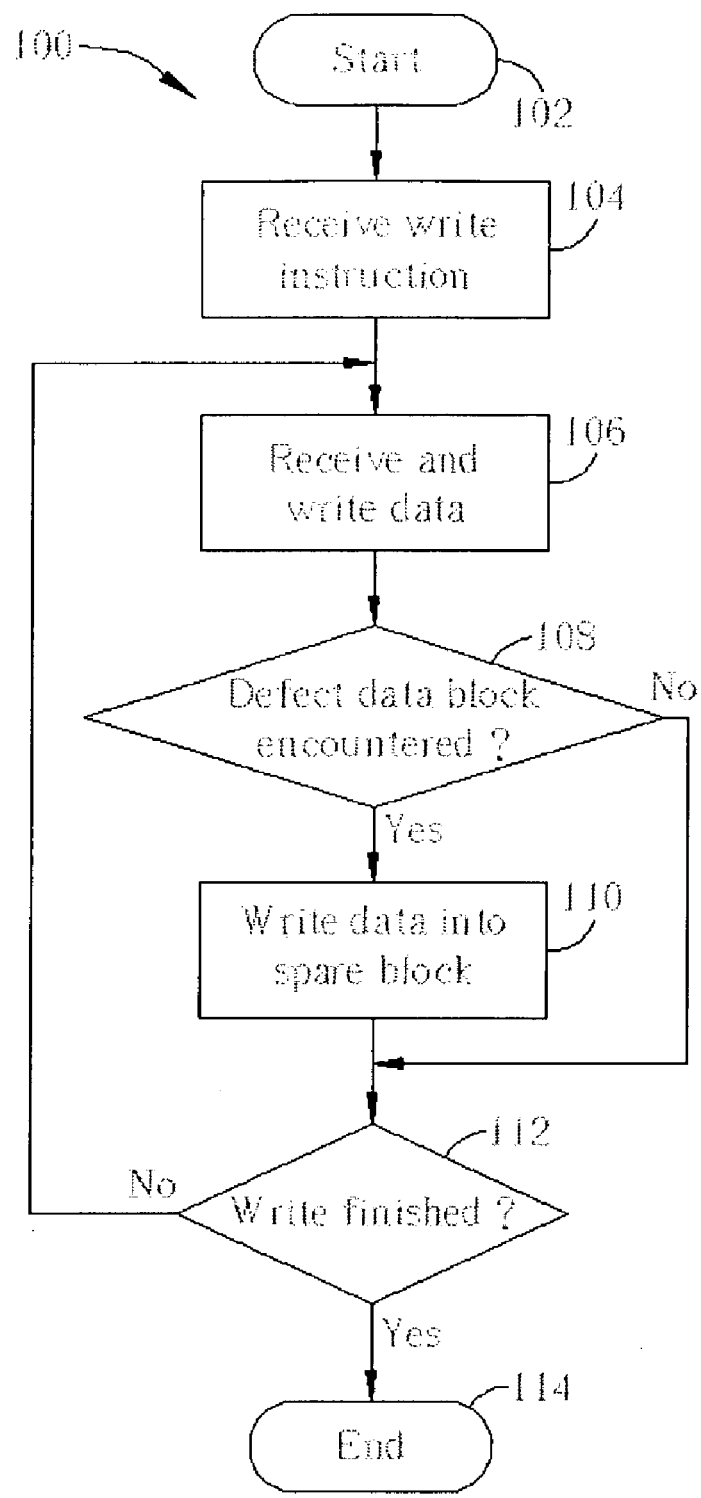
FIG. 3 is a flowchart of an optical disk data write process for the optical disk drive of FIG. 1.
Figure 4A:
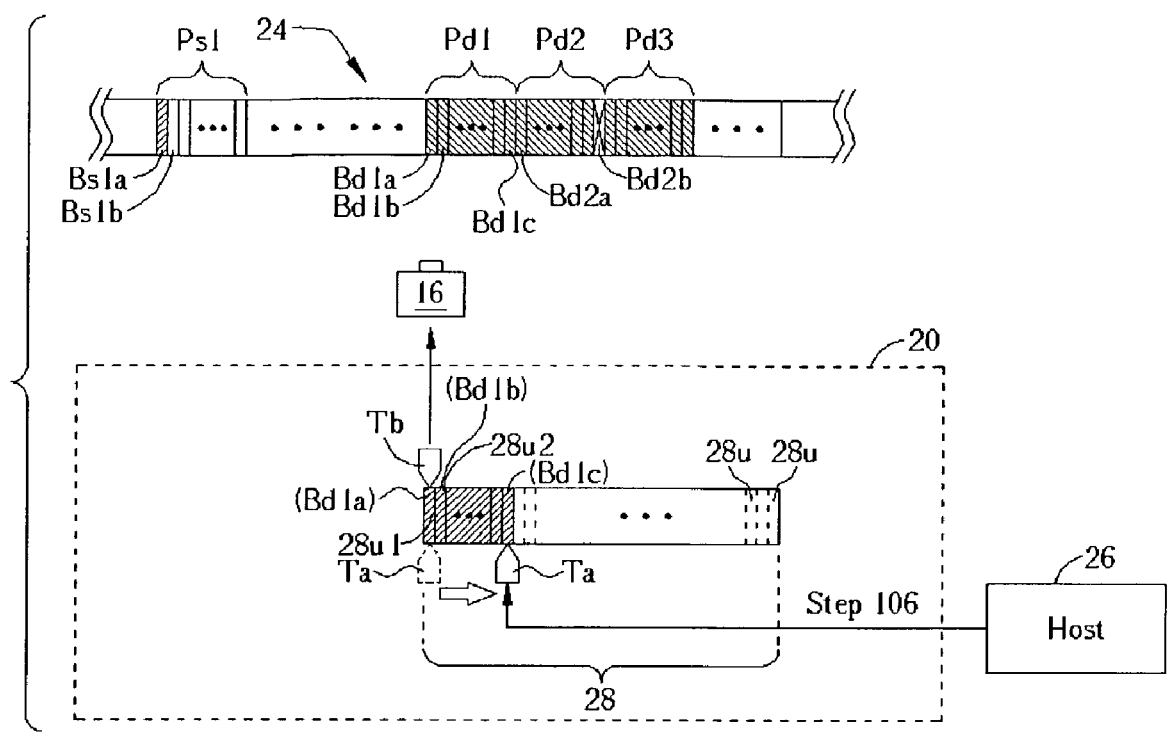
FIGS. 4A to 4E are schematic diagrams of related data allocation during the process of FIG. 3.
Figure 4B:
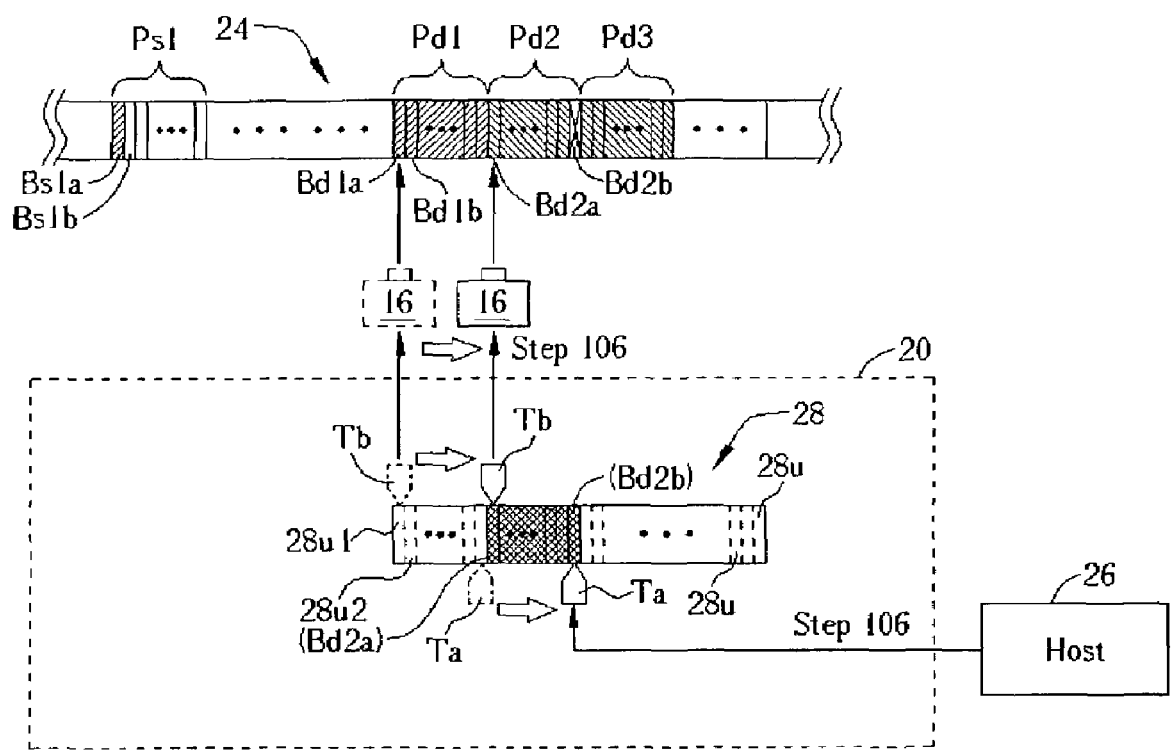
Figure 4C:
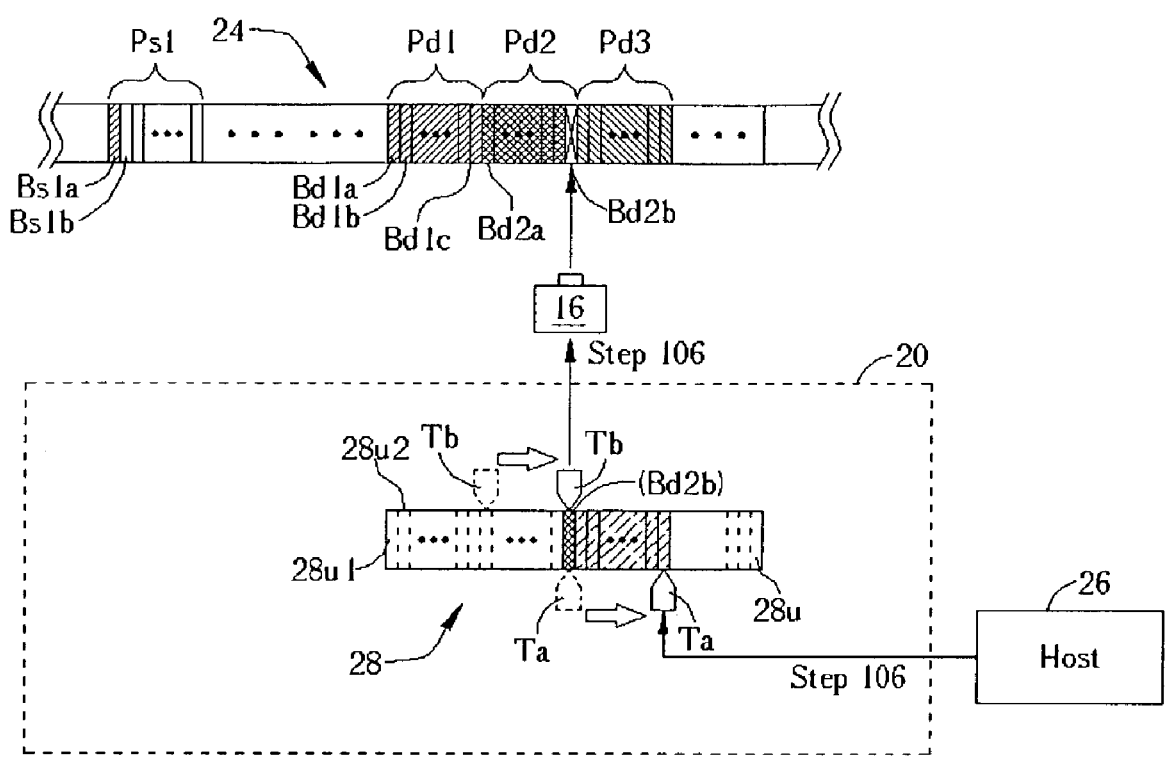
Figure 4D:
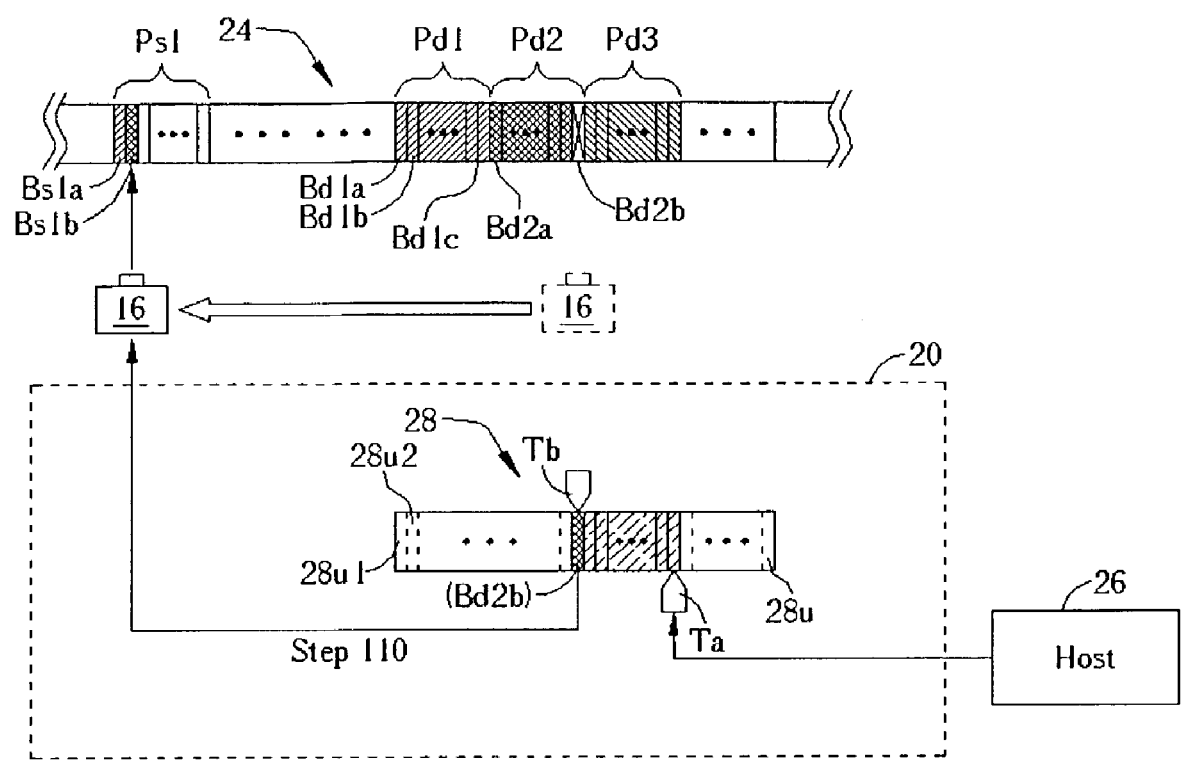
Figure 4E:
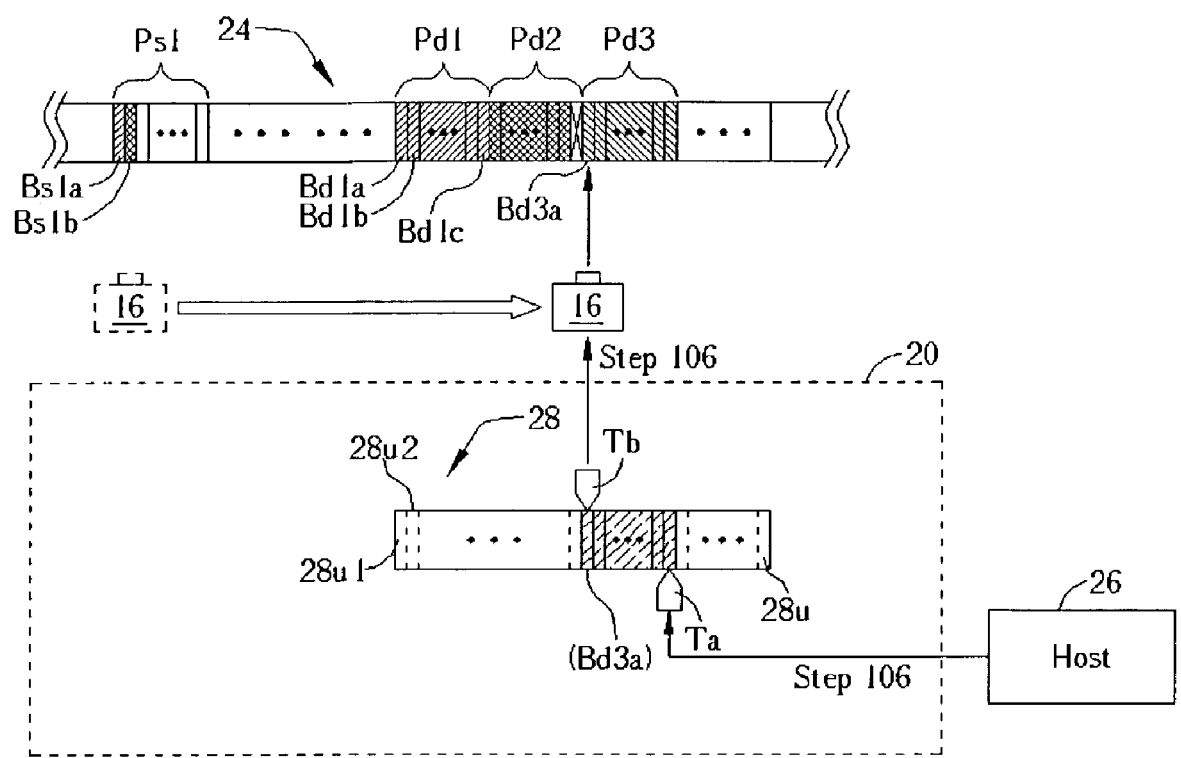
Figure 5:
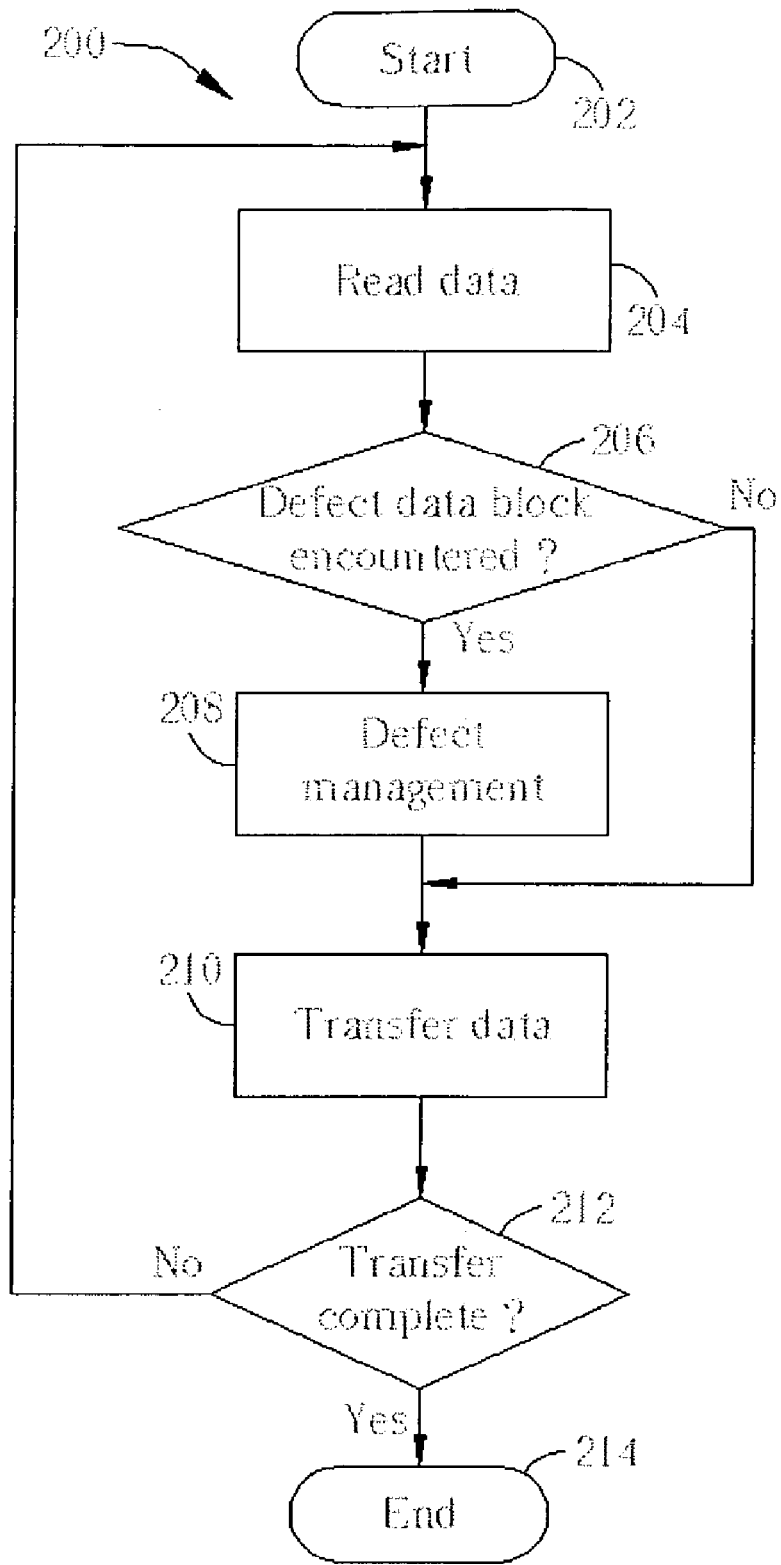
FIG. 5 is a flowchart of an optical disk data read process for the optical disk drive of FIG. 1.
Figure 6A:
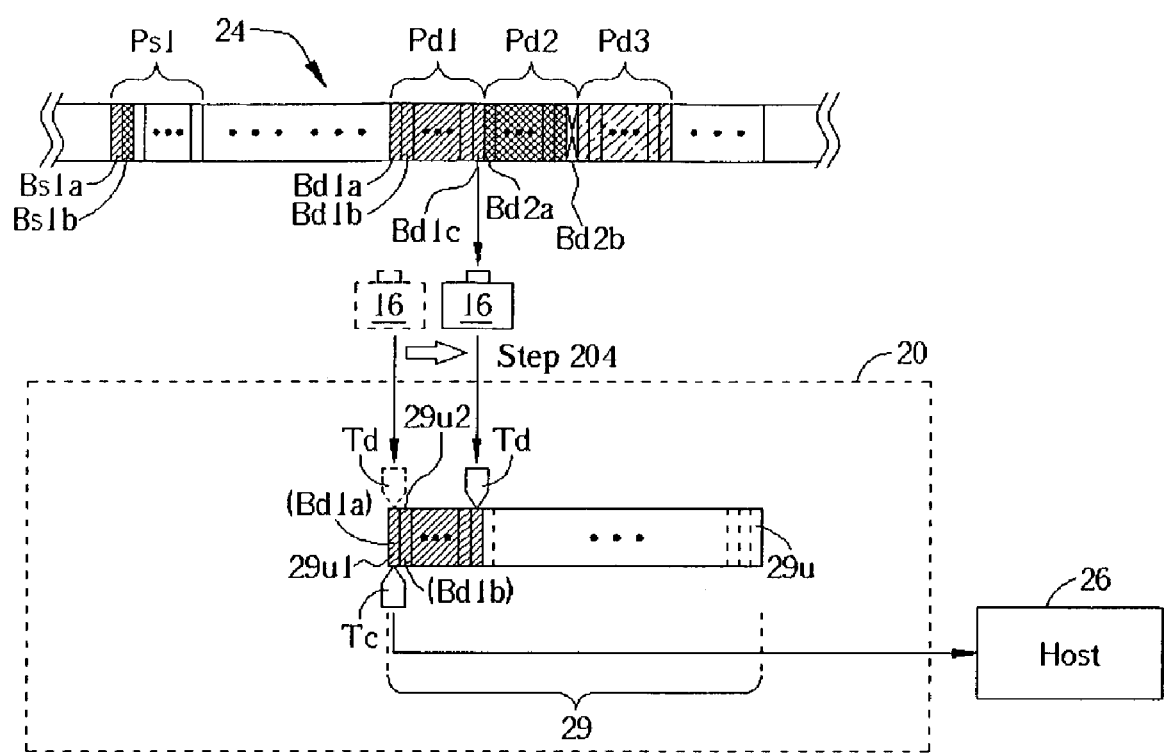
FIGS. 6A to 6D are schematic diagrams of related data allocation during the process of FIG. 5.
Figure 6B:
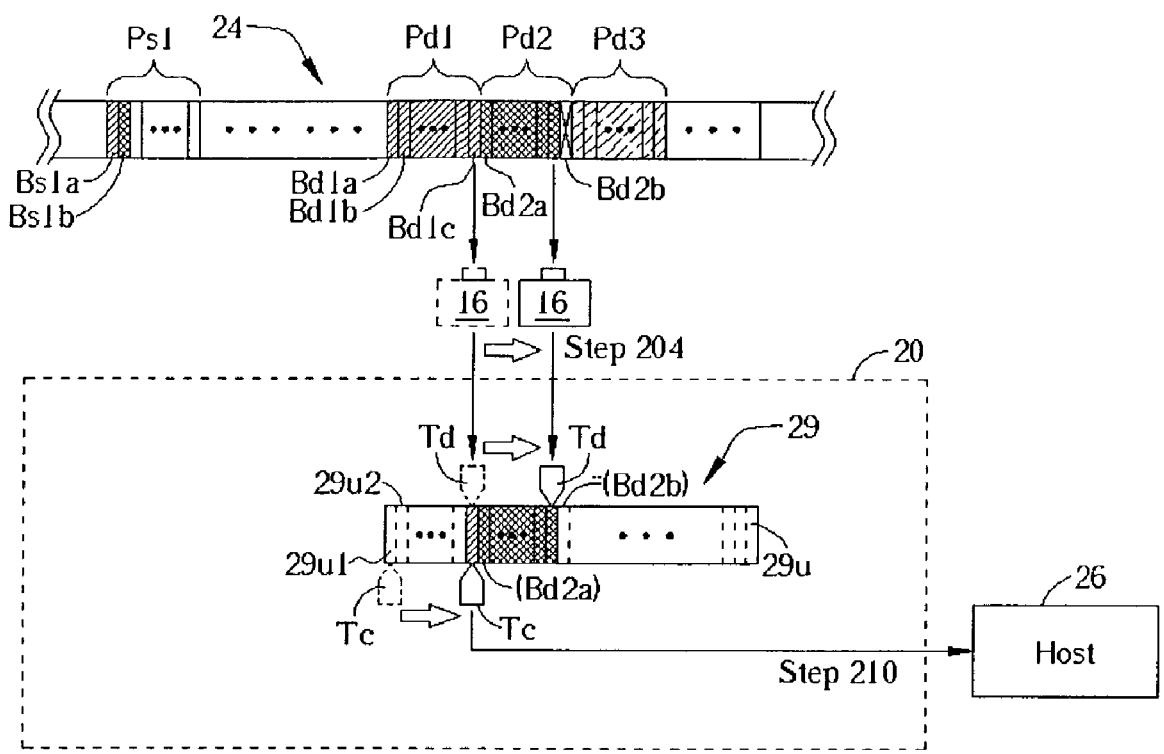
Figure 6C:
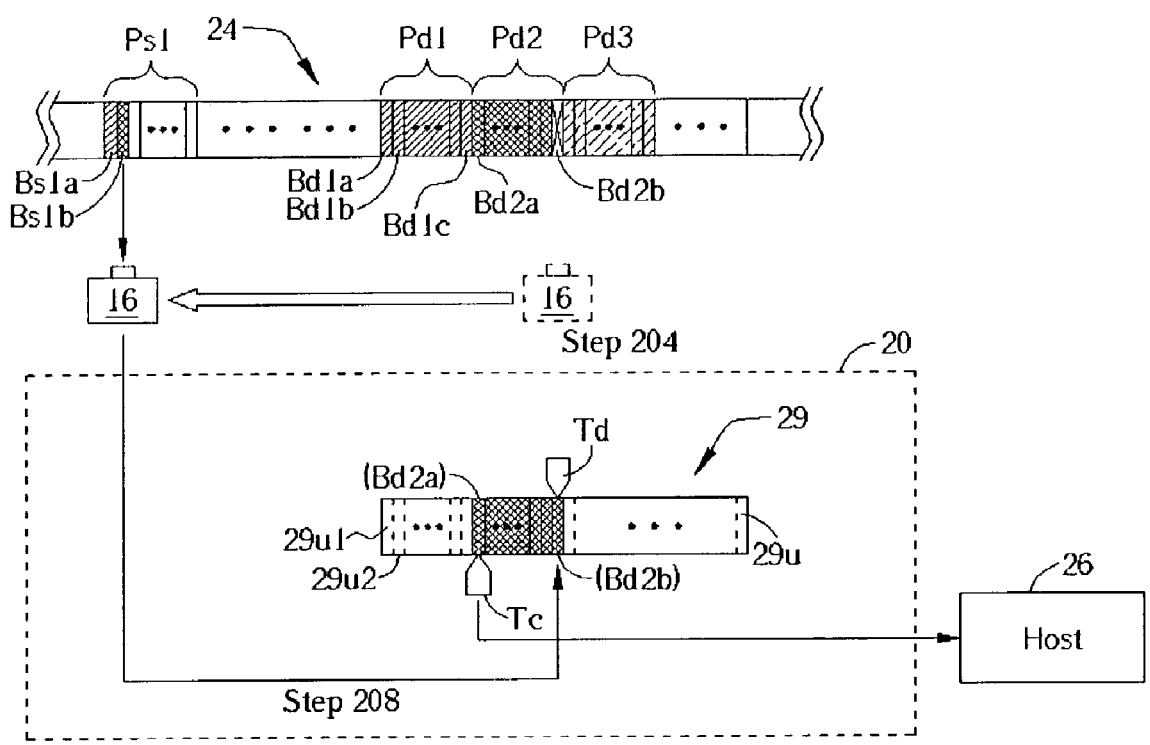
Figure 6D:
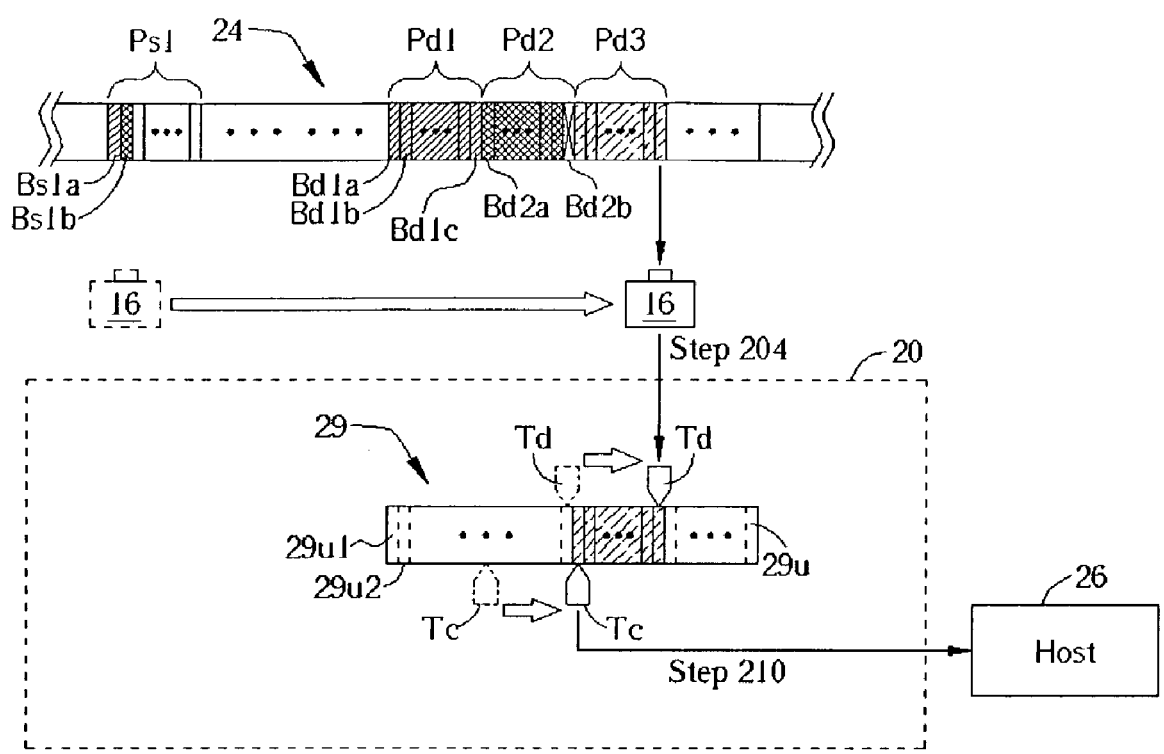
Figure 7:
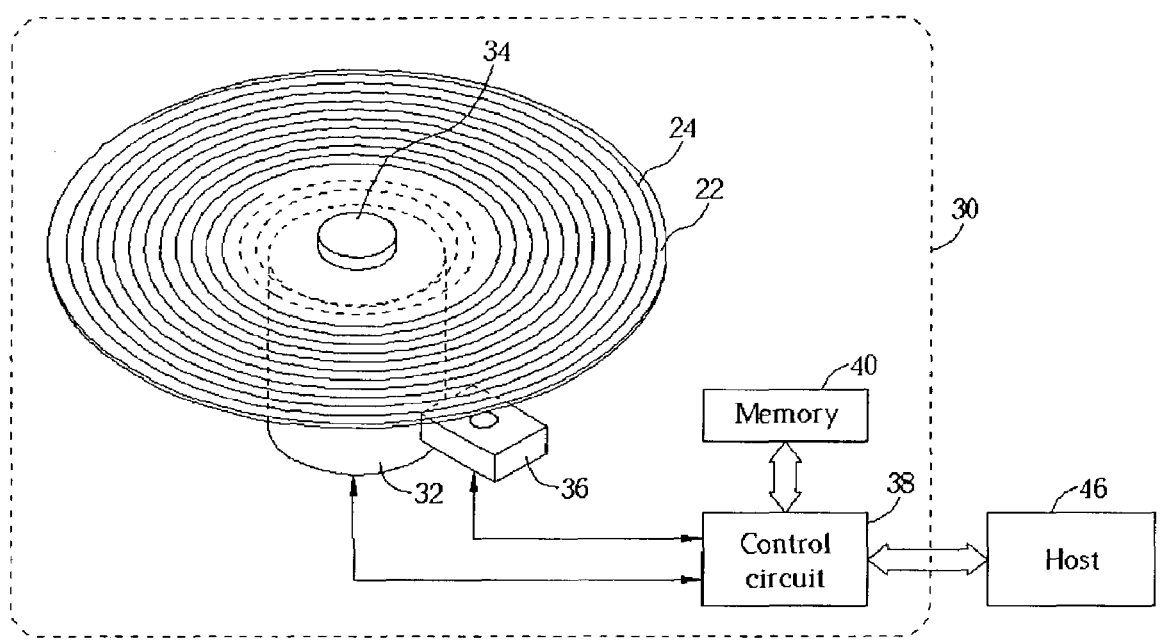
FIG. 7 is the functional block diagram of an optical disk drive according to the present invention.

Please refer to FIG. 7, which is a functional block diagram of an optical disk drive 30 operating with a host 46. The method of the present invention can be applied with the optical disk drive 30 of FIG. 7. By using the host 46 (which can be a computer system such as PC), users can control the optical disk drive 30 to access data on the optical disk 22. The optical disk drive comprises a disk loader 34, a motor 32 that drives the disk loader 34 to spin, a control circuit 38 that controls operation of the optical disk drive 30 and a memory 40 (for instance, a random-access memory) to temporarily store data needed by the control circuit 38 during operation. When the motor 32 drives the disk loader 34 to spin, the optical disk 22 on the disk loader 34 also rotates and the track 24 on optical disk 22 used for recording data travels across a pickup head 36, which can access data on the track 24. The specification of data recorded on the track 24 can be either one shown in FIG. 2A and FIG. 2b (the specifications of CD-MRW or DVD+MRW), in other words, the present invention can apply to various optical disk specifications having spare blocks for defect management.

Figure 8:
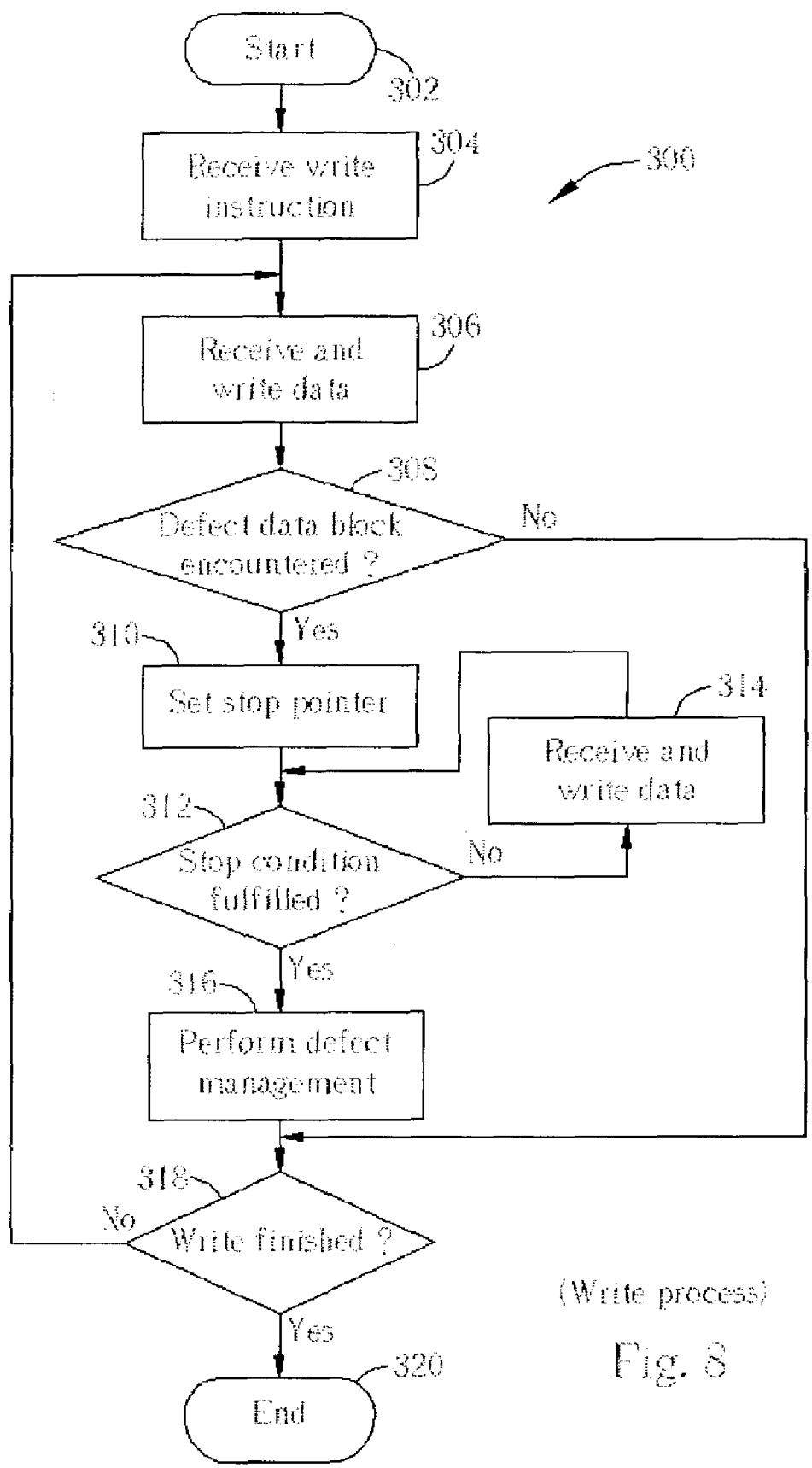
FIG. 8 is a flowchart of an optical disk data write process for the optical disk drive of FIG. 7.

Please refer to FIG. 8. FIG. 8 is a flowchart of an optical disk data write process 300 according to the present invention. In the present invention, related defect management of defect data blocks is performed only after a plurality of defect data blocks are encountered. The following steps make up the process 300:

Step 302: Start. Start process 300 to perform defect management for the optical disk data write process;

Step 304: Receive write instructions from the host 46, and start writing data onto the optical disk 22. The host 46 specifies which data blocks on the optical disk to write to;

Step 306: The host 46 starts to transfer data that is to be written to the optical disk 22 to the optical disk drive 30. The optical disk drive 30 first temporarily stores this data in the memory 40, then uses the pickup head 36 to write the temporary data in the memory 40 to track 24. Similar to the prior art memory space allocation, the present invention also allocates a memory space of fixed capacity, which has a plurality of memory units, each memory unit used to temporarily store one data entry of data blocks. After being transferred to the memory 40, data that the host 46 intends to write to the data block in optical disk 22 is sequentially stored in the memory unit of this memory space. During the write process, the host 46 also references the transfer pointer to store data to the memory unit that the transfer pointer points to. With the progress of the process 300, the transfer pointer will also sequentially point to different memory units, these memory units being used to temporarily store various data entries from the host 46. In the meantime, the pickup head 36 also references a write pointer to write data into corresponding data blocks on the track 24. In other words, data that is temporarily stored in the memory units that write pointer points to will be written to the track 24 by the pickup head 36. As the write process continues, the write pointers also point to different memory units sequentially, and the pickup head writes the data that is temporarily stored in these memory units onto the optical disk 22;

Step 308: The optical disk drive 30 references the Defect Table of the optical disk 22 to determine whether defect data blocks are encountered during the write process; if so, go to step 310; otherwise, continue to step 316;

Step 310: If the defect data block is the first defect data block encountered after the commencement of the process 300, or the first defect data block encountered after the stop pointer in memory 40 is reset, set the memory unit that the stop pointer points to in this step. As described above, data that is supposed to be written into the first defect data block will be stored in one memory unit before being written to the optical disk, when setting the stop pointer in this step, the stop pointer will point to the previous memory unit to this memory unit. The stop pointer can be used to alert the process 300 on when to stop normal data writing and start to perform defect management;

Step 312: If a certain stop condition is fulfilled 300, go to step 316 to perform defect management; if the stop condition is not yet fulfilled, go to step 314 and continue the data write process. In the present invention, the stop condition can be "when the transfer pointer is the same as the stop pointer (meaning that the memory unit that the transfer pointer points to is the same as the memory unit that the stop pointer points to)", or "during data the write process, the pickup head 36 seeks across one spare area to write data into another data area". As shown in the specification of CD-MRW in FIG. 2A, the data area DA where the data blocks are located and the spare area SA where the spare blocks are located are interlaced with each other. For instance, when optical disk drive is required to write data into data areas DA(1) and DA(2), the pickup head 36 must seek across the spare area SA(2), then the data write process can advance from the data area DA(1) to the data area DA(2). Since the pickup head 36 must perform seek movement, before the pickup head seeks and shifts to data area DA(2), the optical disk drive 30 can process all the defect management needed for data to be written into the data area DA(1). In other words, before the pickup head moves to the data area DA(2), step 316 can be performed;

Step 314: Continue to receive data from the host 46, write data in the memory to the optical disk; the transfer pointer and the write pointer also advance continuously;

Step 316: Finish processing all the defect management accumulated so far before the stop condition is fulfilled in this step, including moving the pickup head to the corresponding spare block of every defect data block, and writing the data that is supposed to be written into these defect data blocks into these spare blocks. After finishing defect management, reset the stop pointer;

Step 318: If finished writing data, proceed to step 320; if more data needs to be written to the optical disk 22, go back to step 306;

Step 320: Finish process 300.

From the process 300 of FIG. 8, we know that the present invention will not perform corresponding defect management on individual defect data blocks immediately when a defect data block is encountered in step 308 during optical disk data write process. The present invention waits until the stop condition of the writing process 300 is fulfilled, and then in step 316 performs all the defect management for the defect data blocks encountered so far during writing process. In other words, before the stop condition is fulfilled, the process 300 suspends all the defect management needed in order to avoid normal data write interruption (the process of continuous data writing to data blocks). For more information on the flow of the process 300 of the present invention, please refer to the following example.

Please refer to FIG. 9A to FIG. 9K (and also FIG. 8). FIG. 9A to FIG. 9K show related data allocation of memory 40 and track 24 during the process 300. Similar to the memory allocation of the prior art, during the process 300 of the present invention, a memory space 48 having fixed memory capacity is allocated in the memory 40. A plurality of memory units 48$u$ (for simplified discussion, three memory units are marked as 48$u$1, 48$u$2 and 48$u$3) are provided, each memory unit being used to temporarily store one data entry that is supposed to be written into a data block. Data transferred from the host 46 that is supposed to be written onto the optical disk 22 is temporarily stored in the memory space 48, and then written to the track 24 of the optical disk 22. Similarly, the memory 40 also uses the transfer pointer Tr to represent the progress of data transferring from the host 46 to the optical disk drive. A write pointer Tw is used to represent the progress of data writing into corresponding data blocks by the pickup head 36. In other words, data transferred from the host 46 is temporarily stored in the memory unit that the transfer pointer Tr points to; and the pickup head 36 writes the data in the memory unit indicated by write pointer Tw to the optical disk 22. In the example in FIG. 9A to FIG. 9H, it is supposed that the host 46 will write data into packets Pd1 to Pd6 on track 24.

Figure 9A:
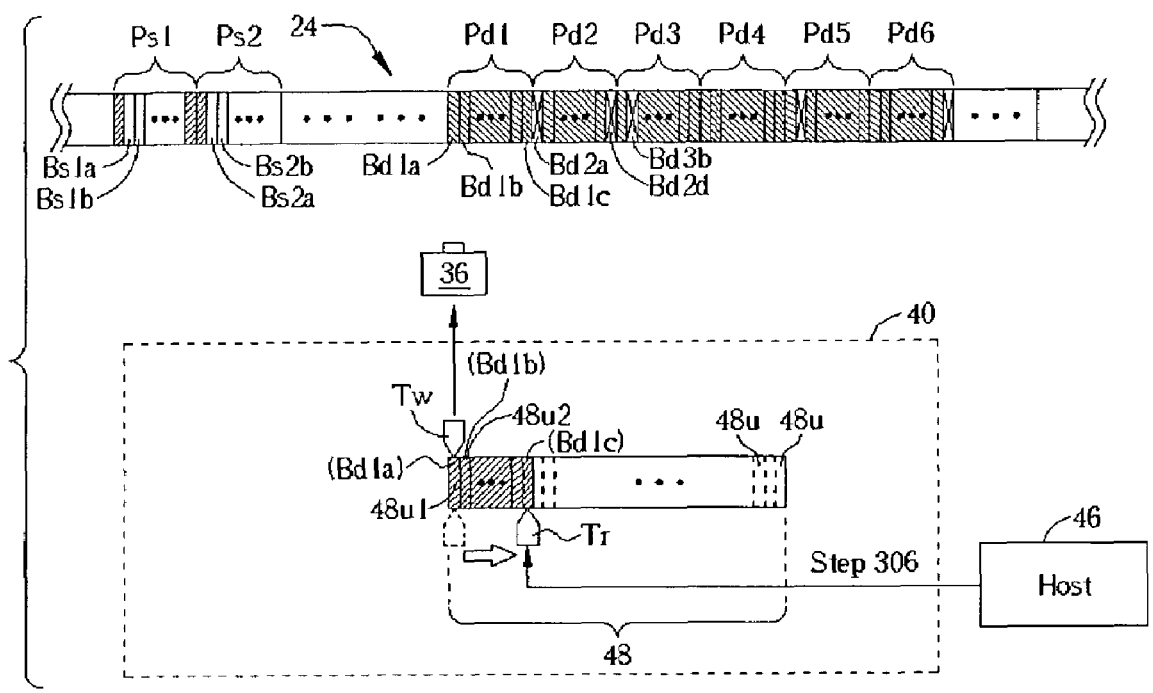
FIGS. 9A to 9K are schematic diagrams of related data allocation during the process of FIG. 8.
Figure 9B:
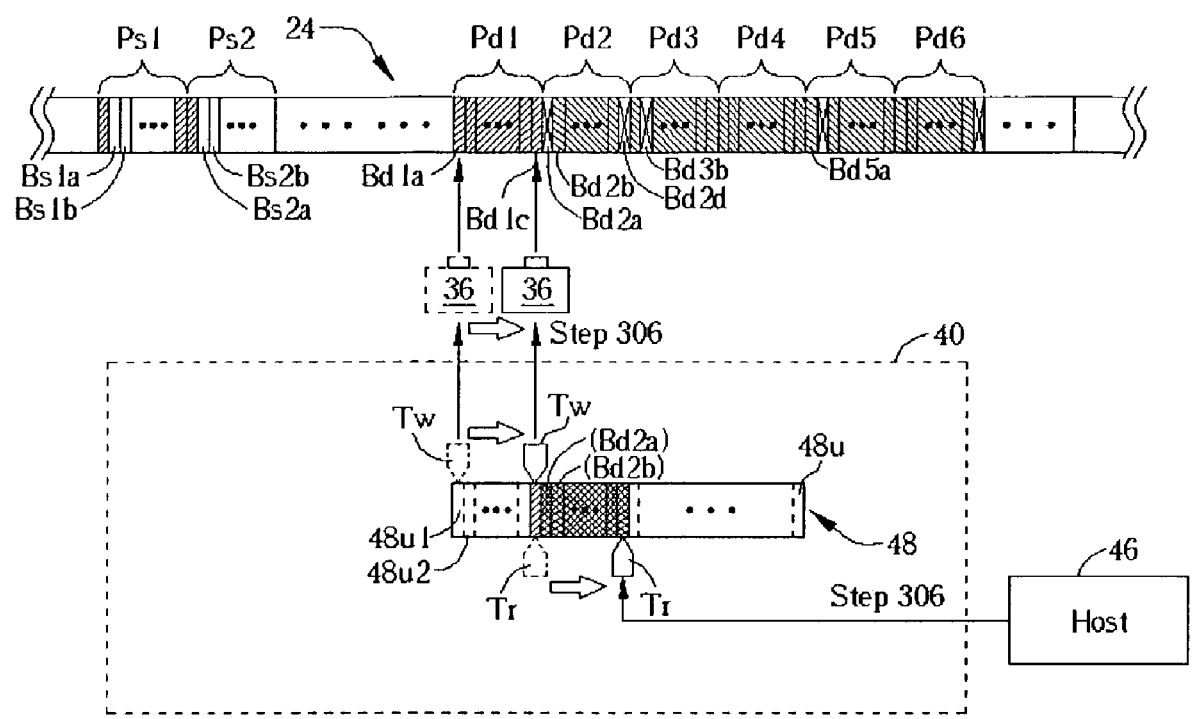
Figure 9C:
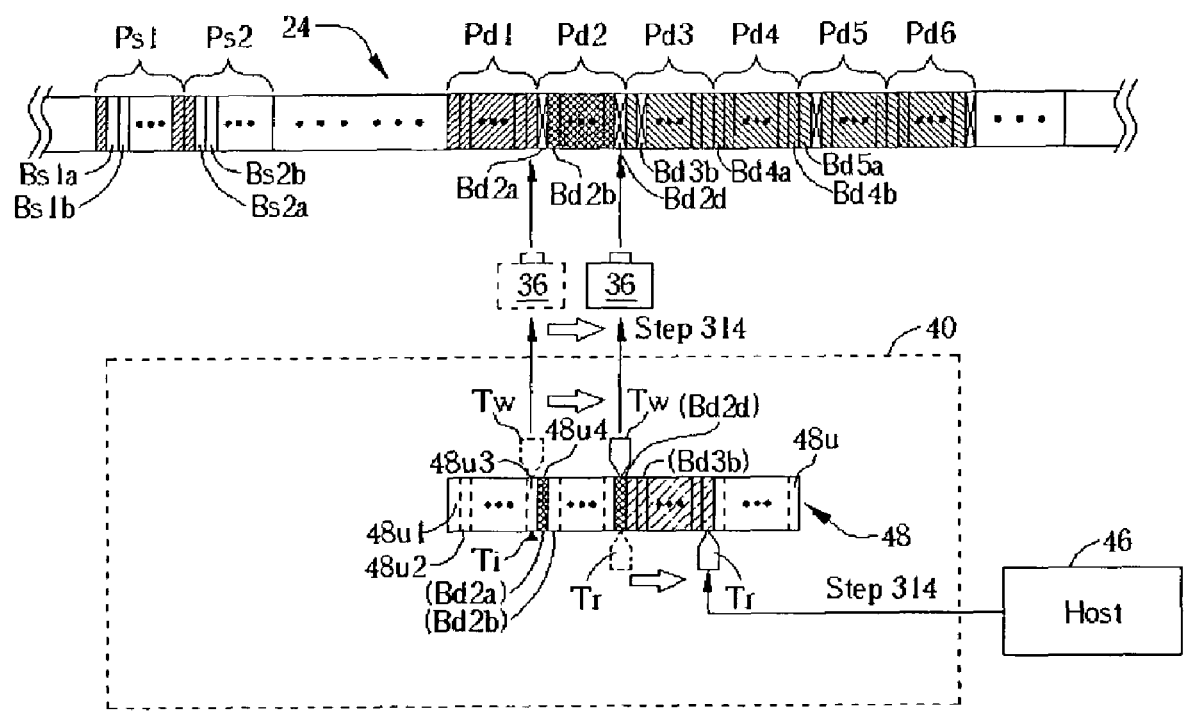

As shown in FIG. 9A, as the transfer pointer Tr sequentially points to the memory units 48$u$1, 48$u$2, the host 46 writes data that is supposed to be written into data block Bd1$a$, Bd1$b$ into the memory 40 (step 306). Since the pickup head 36 has not started writing data into the track 24, the write pointer Tw still points to the memory unit 48$u$1. As shown in FIG. 9B, as the process 300 proceeds to step 306, the write pointer Tw points to different memory units sequentially, and the pickup head also starts writing data into the data blocks on the track 24. In the meantime, the transfer pointer Tr keep advancing, and temporarily stores the data that is supposed to be written into the data block Bd2$a$, Bd2$b$ in the memory units. Supposing two defect data blocks were in the packet Pd2, when the process 300 in FIG. 9C encounters defect data block Bd2$a$ in step 308, step 310 is processed to set the corresponding stop pointer Ti for this defect data block. Because the data that is supposed to be written into the defect data block Bd2$a$ is stored in the memory unit 28$u$4 temporarily, the memory unit 28$u$3 pointed to by the stop pointer Ti is the previous memory unit 28$u$4. After the process 300 enters step 312, because the transfer pointer Ta goes beyond the stop pointer Ti and the pickup head 36 does not need to cross over any spare block to continue writing data, the stop condition is not fulfilled and process 300 does not perform any defect management for the defect data block Bd2$a$ at this moment. The process 300 proceeds with the data write process (step 314), continuing to write data of packet Pd2 to track 24. Generally speaking, if the data content of each memory unit has been written to track 24, then the memory unit can be released to store other data. For instance, in FIG. 9C, the memory unit that stores data for data block Bd2$b$ can be released after the pickup head 36 writes data into data block Bd2$b$. However, since the data that is supposed to be written into defect data block Bd2$a$ is now temporarily stored in the memory unit 48$u$4, and the process 300 has not yet performed any defect management for the defect data block Bd2$a$, the data in the memory unit 48$u$4 cannot yet be released.

Figure 9D:
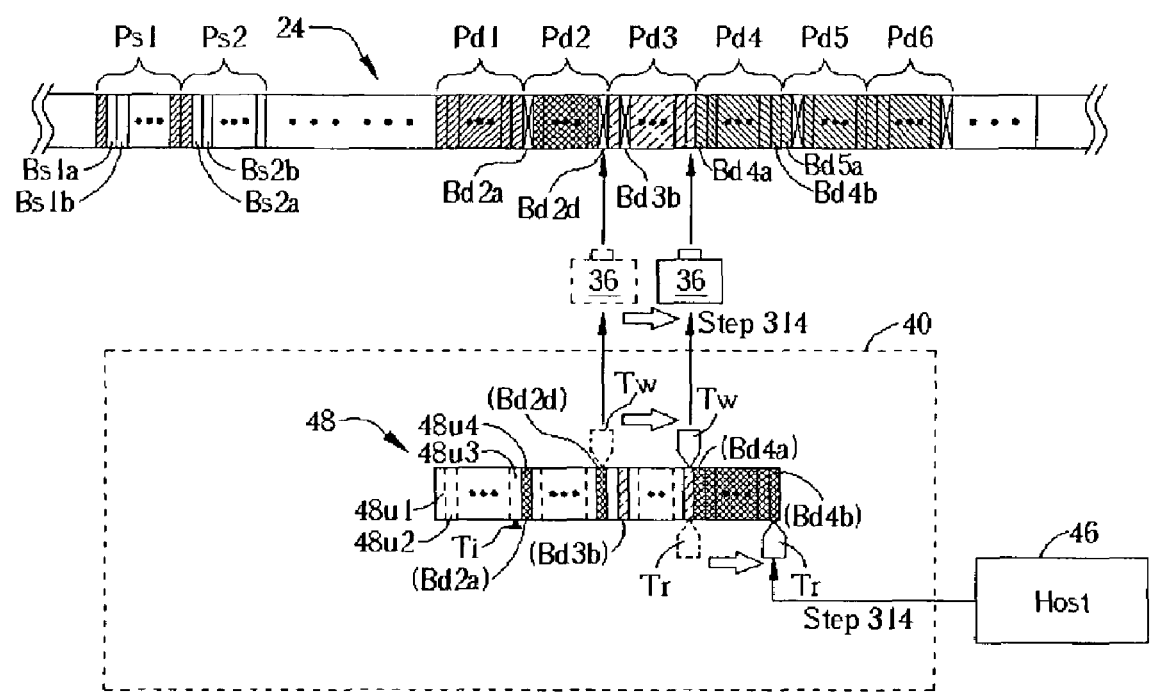
Figure 9E:
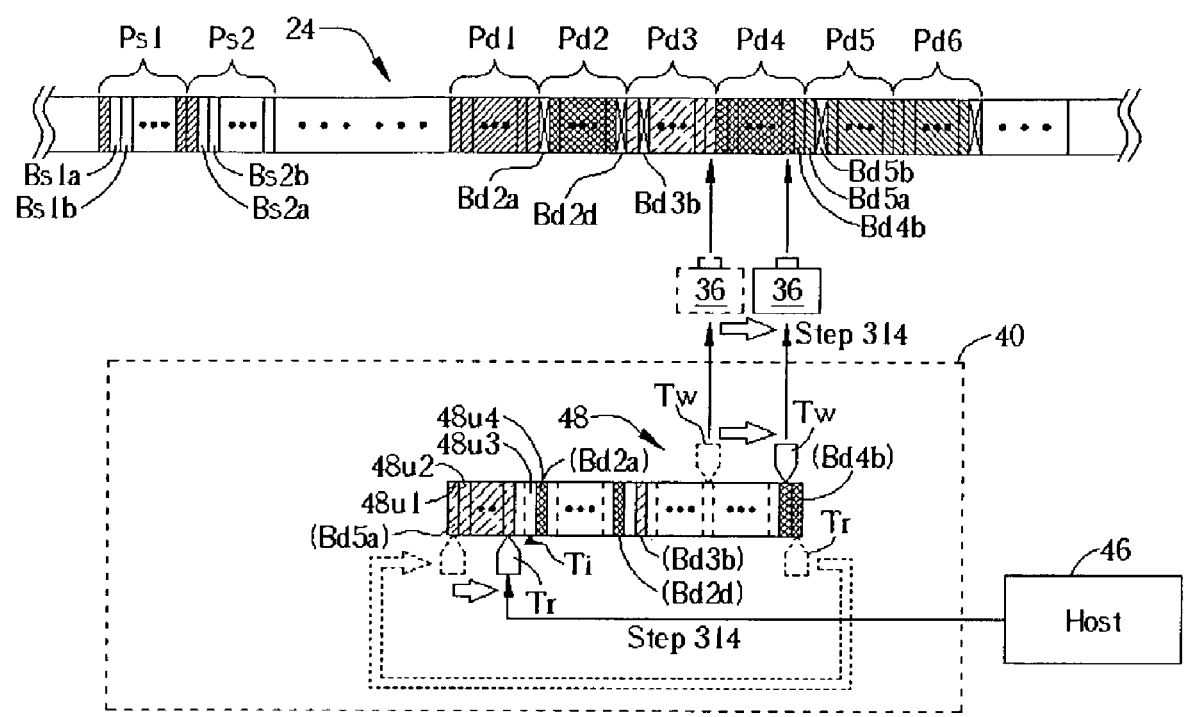
Figure 9F:
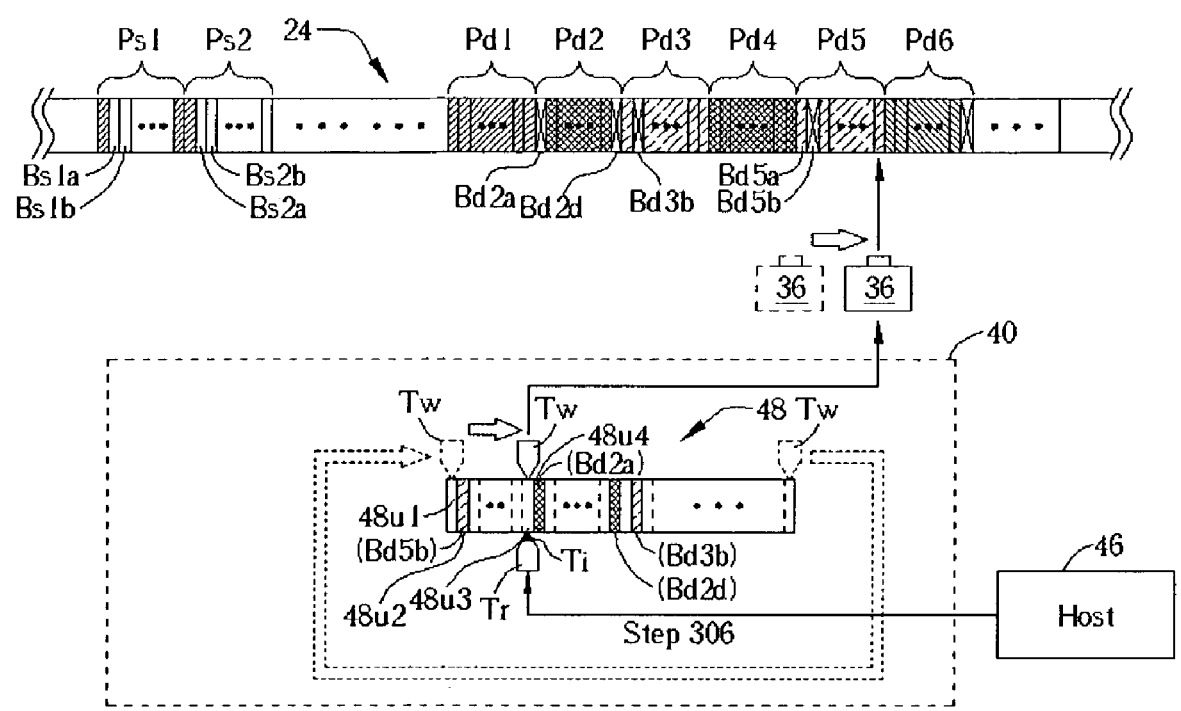

As shown in FIG. 9D, although the second defect data block Bd2$d$ is encountered when the process 300 writes data into the packet Pd2 as the process reaches step 310 (for the second defect data block, the stop pointer Ti will not change) and step 312, the memory unit indicated by the transfer pointer Tr is still not the memory unit 48$u$3 pointed by stop pointer T. Thus, the stop condition 312 is not fulfilled, and process 300 does not perform any defect management for the defect data block Bd2$d$ at this moment, but proceeds with the data writing process. Similarly, when the process 300 enters the stage shown in FIG. 9E, and another defect data block Bd3$b$ is encountered, still nothing further happens because the stop condition is not fulfilled. However, data of the defect data blocks to be written is stored in corresponding memory units. In the preferred embodiment of the present invention, the transfer pointer Tr and the write pointer Tw can utilize a cyclic sequence to recycle memory space 48. The transfer pointer Tr points to the last memory unit in the memory space 48 in FIG. 9D, circulates in FIG. 9E and follows the sequence of 48*u*1 and 48*u*2 to temporarily store data from the host 48 into released memory units. Please note, when the process 300 uses memory space for the first time (as in FIG. 9A), the memory units 48*u*1 to 48*u*3 are not used to store data that is supposed to be written into defect data blocks, the stop pointer Ti points to the memory unit 48*u*3, and the memory unit 48*u*4 stores the data corresponding to the data block Bd2*a*, the first defect data block encountered after the process 300 started in FIG. 9A. Because no defect management is performed for the defect data block Bd2*a*, data in the memory unit 48*u*4 cannot be overwritten yet. In other words, the memory unit 48*u*3 pointed to by the stop pointer Ti is the last memory unit that can be overwritten by the transfer pointer Tr during memory unit recycling. If the memory unit pointed to by the transfer pointer Tr changes from 48*u*1, 48*u*2 to 48*u*3 continuously, and if the transfer pointer Tr points to the memory unit 48*u*4, data stored in the memory unit 48*u*4 that corresponds to the defect data block Bd2*a* can be overwritten by the data from the host 46. In order to prevent the situation described above from happening, the stop condition in step 312 specifies that when the transfer pointer Tr advances to the stop pointer Ti, further data writing is suspended and step 316 is proceeded to, which performs defect management on all defect data blocks encountered during the process 300. As shown in FIG. 9F, when the transfer pointer Tr is the same as the stop pointer Ti (these two pointers point to same memory space), the optical disk drive 30 stops receiving data from the host 46 and makes sure that the transfer pointer Tr does not advance to the memory unit 48*u*4 during defect management. In the meantime, the write pointer Tw writes the data corresponding to the data packet Pd5 in memory units 48*u*1 to 48*u*3 into the track 24, with the write pointer Tw stopping at the memory unit 48*u*3. Supposing the data packet Pd5 also has a defect data packet Pd5*b*, when the process 300 moves to step 316 to perform defect management on all defect data blocks, it will perform related defect management on four defect data blocks Bd2*a*, Bd2*d*, Bd3*b*, and Bd5*b*.

Figure 9G:
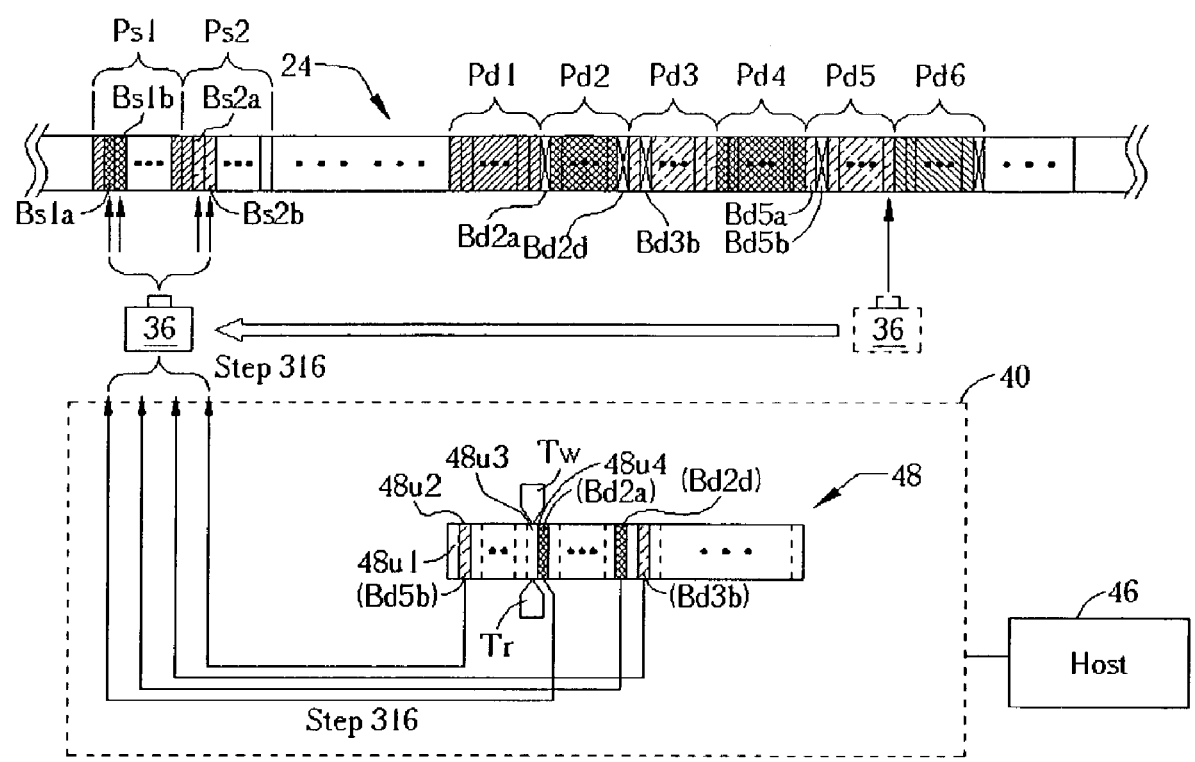
Figure 9H:
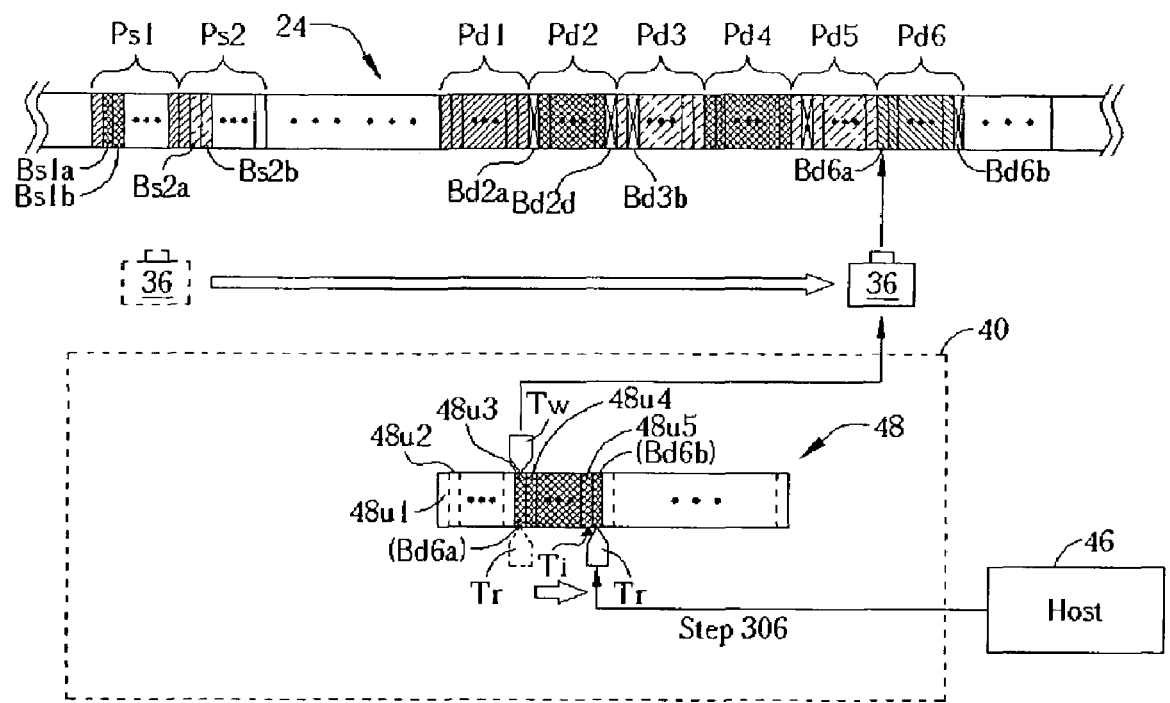

Referencing the defect data blocks described above, suppose that the spare blocks used as substitutes for these defect data blocks are spare blocks Bs1*a*, Bs1*b*, Bs2*a*, Bs2*b* located in spare packets Ps1 and Ps2. The pickup head 36 starts to seek and move to the corresponding locations of these spare blocks, and necessary operations are performed to write the data that is supposed to be written into these defect data blocks Bd2*a*, Bd2*d*, Bd3*b*, Bd5*b* into the spare blocks Bs1*a*, Bs1*b*, Bs2*a*, Bs2*b* respectively (step 316). After finishing defect management as shown in FIG. 9G, the memory units that were used to record the corresponding data in the data blocks Bd2*a*, Bd2*d*, Bd3*b* and Bd5*b* are released and can be used to store other data. As shown in FIG. 9H, after completing step 314, the memory unit 48*u*4 and other memory units that are used to temporarily store data required for defect management are now released, and used to temporarily store data from the host 46 to the track 24. The transfer pointer Tr and the write pointer Tw advance, while the stop pointer Ti is reset. Suppose Pd6*b* is the first defect data block encountered during data write process, afterward the stop pointer Ti will point to the memory unit 48*u*5. The process 300 will suspend defect management for an individual defect data blocks during the writing process, until the stop condition is fulfilled once again. Please note, as shown in FIG. 9G, the spare blocks that substitute neighboring defect data blocks are usually closely scattered in vicinity on the track 24 (i.e. the same spare packet or neighboring spare packet in the same spare area), so when a plurality of data is written into a plurality of spare blocks to implement a plurality of defect management sequences, there is no need for the pickup head 36 to travel a long distance. In other words, accumulating and processing a plurality of defect management sequences for defect data blocks can effectively minimize the mechanical movement of the pickup head 36.

Figure 9I:
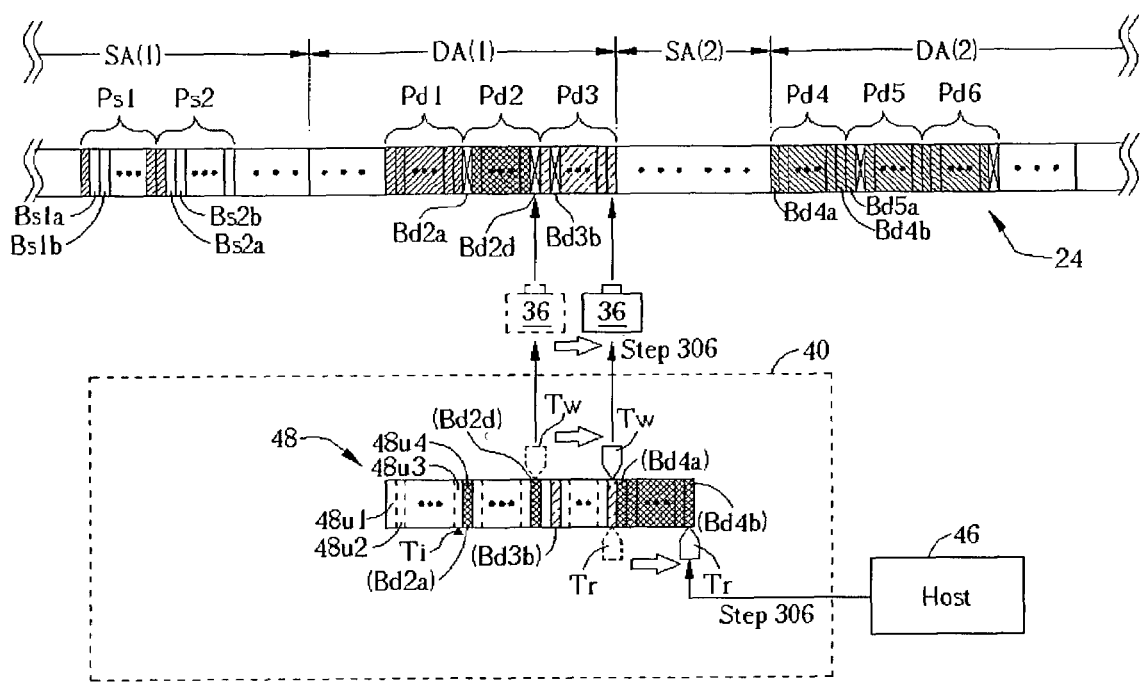
Figure 9J:
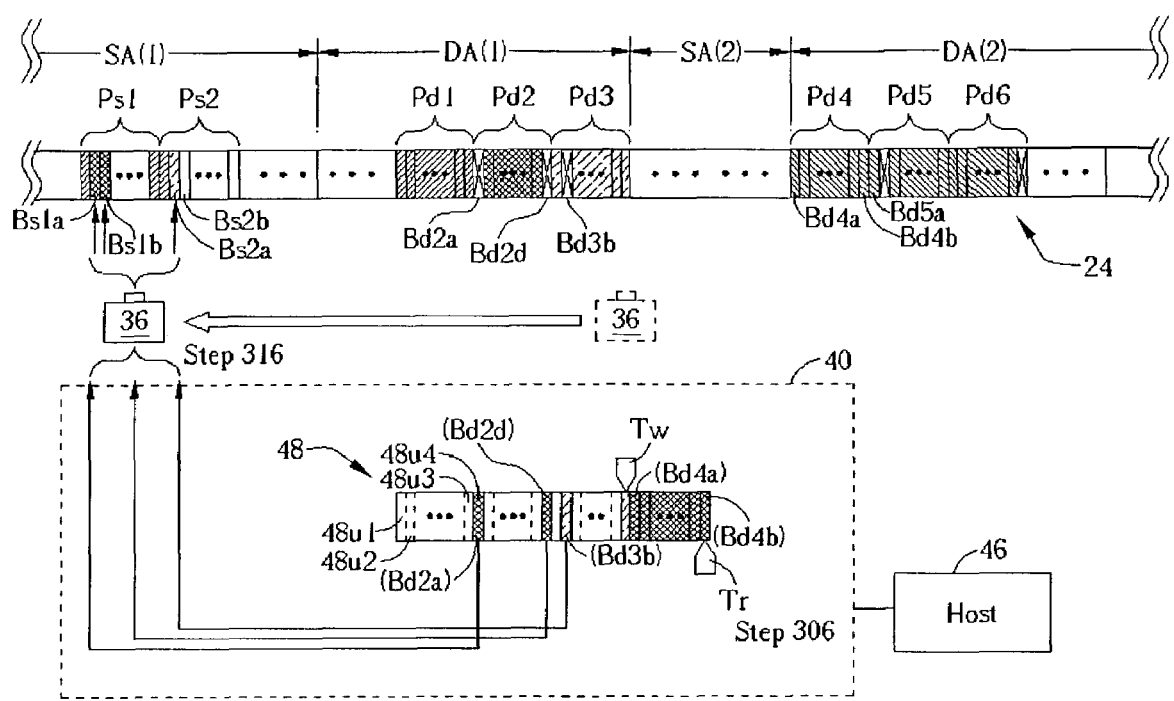
Figure 9K:
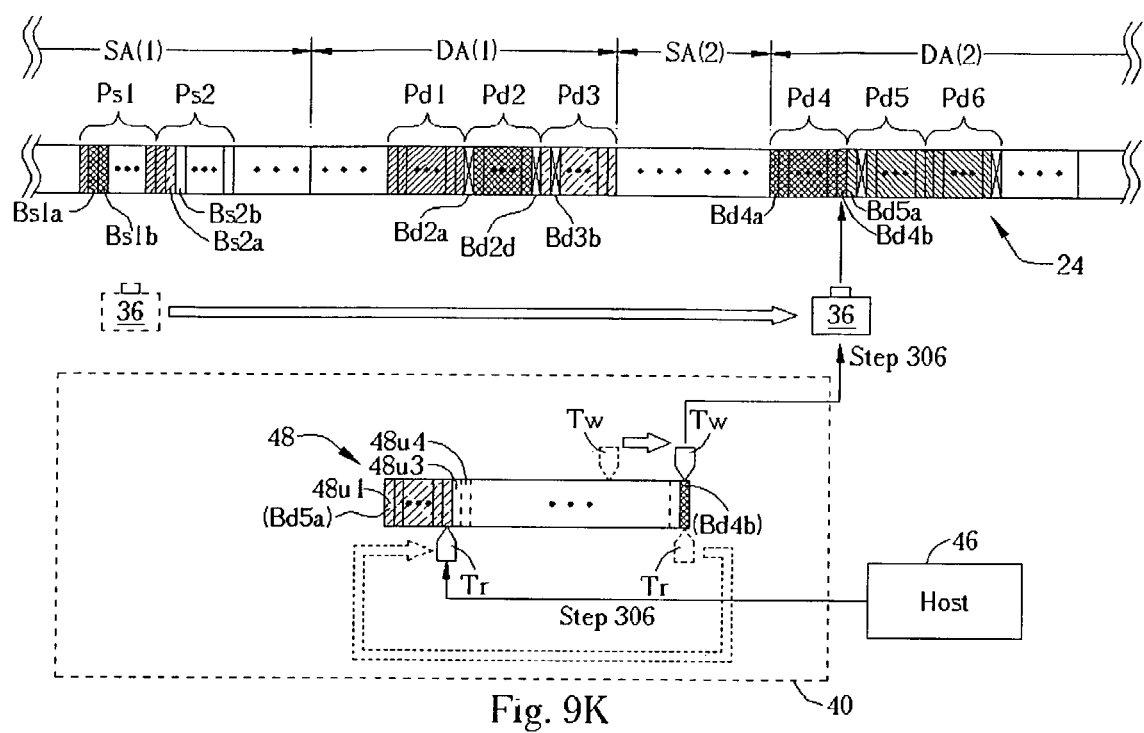

As described above, when the pickup head 36 has to perform seeking operations before continuing to write data, the process 300 of the present invention can also perform defect management at the same time (step 316). FIG. 9I shows the process shown in FIG. 9A to FIG. 9D, however, with the data packets Pd3 and Pd4 belonging to different data areas DA(1) and DA(2). Because the data packets Pd3 and Pd4 are separated by the spare area SA(2), if the optical disk drive 30 is required to write data to the data packet Pd1 to Pd4 continuously, it must perform a seek operation. Since the pickup head 36 has to seek to the corresponding location of the data area DA(2), the process 300 can perform accumulated defect management of the defect data blocks Bd2*a*, Bd2*d*, and Bd3*b* before any further data write process. As shown in FIG. 9J, the pickup head 36 seeks to the location of the corresponding spare blocks of the defect data blocks, performs step 316, and then in FIG. 9K seeks back to the corresponding location of the data packet Pd4 continuing further data writing processes. At this time, the stop pointer Ti is reset; and during the further data writing processes, defect management for defect data blocks are accumulated and suspended until the stop condition is once again fulfilled so the data write process can continue without interruption.

To summarize the above discussion, the optical disk data write process 300 of the present invention suspends defect management for defect data blocks during a continuous data write process until a stop condition is fulfilled allowing accumulated defect management to be performed together. In this way, interruption of the optical disk data writing process caused by defect management and burden by mechanical operation of the optical disk drive 30 can be effectively reduced. The stop condition revealed by the present invention uses the stop pointer Ti to mark the limit of memory space that can recycle memory units, specifically, the memory space 48 in the memory 40 can be fully used without overwriting the data needed (i.e. data that is supposed to be written into defect data blocks) for defect management. This extends the continuity of the data writing process, not only improving the efficiency of the data write process, but also maintaining necessary defect management.

Corresponding to the data write process of the present invention, the same principle is used to improve efficiency and reduce the interruption caused by defect management of a data read process according to the present invention. Please refer to FIG. 10. FIG. 10 is flowchart of an optical disk data read process 400 according to the present invention. The following steps make up the process 400:

Step 402: The Process 400 starts. The optical disk drive 30 receives read instructions from the host 46, and the process 400 beings performing the optical disk data read process. The host 46 indicates to the optical disk drive 30 what data in the data blocks is to be read;

Step 404: The optical disk drive 30 uses the pickup head 36 to read the designated data blocks assigned by the host 46 on the optical disk 22. Data that is supposed to read by the optical disk drive 30 is first temporarily stored in the memory 40, the control circuit 38 being used to transfer the data in the memory 40 to the host 46. Similar to prior art memory space allocation, the present invention also allocates a memory space having a fixed capacity, this memory space having a plurality of memory units with each memory unit used to temporarily store one data entry of the data blocks. In addition, the present invention uses a read pointer to indicate the progress of data reading from optical disk 22. During optical disk data reading, the read pointer points to different memory units sequentially, and data read by the optical disk drive 30 from the optical disk data blocks is stored in the memory space temporarily as indicated by the read pointer. Related to the read pointer, the progress of data transfer to the host 46 from the memory can be indicated by a transfer pointer. The optical disk drive 30 transfers data in the memory units that are pointed to by the transfer pointer to the host 46; as the transfer pointer points to different memory units sequentially, data from all data blocks in the memory 40 can be sequentially transferred to the host 46;

Step 406: The optical disk drive 30 references the Defect Table of the optical disk to check if defect data blocks are encountered during the read process. If defect data blocks are encountered, go to step 408; otherwise go to step 416;

Step 408: Based on the first defect data blocks encountered during the read process the stop pointer is set. Memory units indicated by the stop pointer are used to temporarily store the previous memory unit to the memory unit corresponding to the first defect data block. if the defect data block encountered is not the first defect data block of the process 300 (or the stop pointer is already set), then it is not necessary to change the memory unit that the stop pointer points to. After setting the stop pointer, data in the memory is transferred to the host continuously, until the transfer pointer is the same as the stop pointer. In other words, when the transfer pointer and the stop pointer point to same memory unit, transfer pointer stops advancing. Once the transfer pointer has transferred data from the memory unit pointed to by the stop pointer to the host 46, further data transfer is suspended;

Step 410: Check if the stop condition is fulfilled. In the process 400, the stop condition can be similar to the previously described stop condition in the process 300. That is, if the read pointer and the stop pointer point to the same memory unit, then the stop condition is fulfilled. After the stop condition is fulfilled, proceed to step 414 to start defect management; if the stop condition is not fulfilled, go back to step 412 and continue to read data from the optical disk to the memory 40. In addition, if the pickup head 36 has to seek and cross over other spare areas to perform continuous data reading, the stop condition can be considered fulfilled, proceed to step 414 for defect management;

Step 412: Continue to read the data of the data blocks of the optical disk 24 into the memory units of the memory. Of course, with the progress of data reading, the read pointer continuously advances to different memory units. After finishing step 412, the process 400 returns to step 410 and tests repeatedly during the read process to see if the stop condition is fulfilled;

Step 414: Perform defect management. The pickup head 36 moves to the spare blocks corresponding to the defect data blocks, and reads data that is recorded in the corresponding spare blocks to the memory 40. Data requests by the host 46 can now be completed. In the meantime, the stop pointer can be reset;

Step 416: Transfer data in the memory 40 to the host 26. If the process 400 goes from step 414 to this step, it means that defect data blocks were encountered during the optical disk data reading. However, after the stop is condition fulfilled, corresponding spare blocks can be read in step 414 to correctly supply the data requested by host 46. Hence in this step, data is transferred to the host 46;

Step 418: If all the data requested by the host 46 is transferred to the host 46, proceed to step 420; if not, return to step 404;

Step 420: The optical disk data read process 400 is finished. Wait until the host 46 requests the optical disk drive to read data from the optical disk before restarting the process 400 from step 402.

Figure 11A:
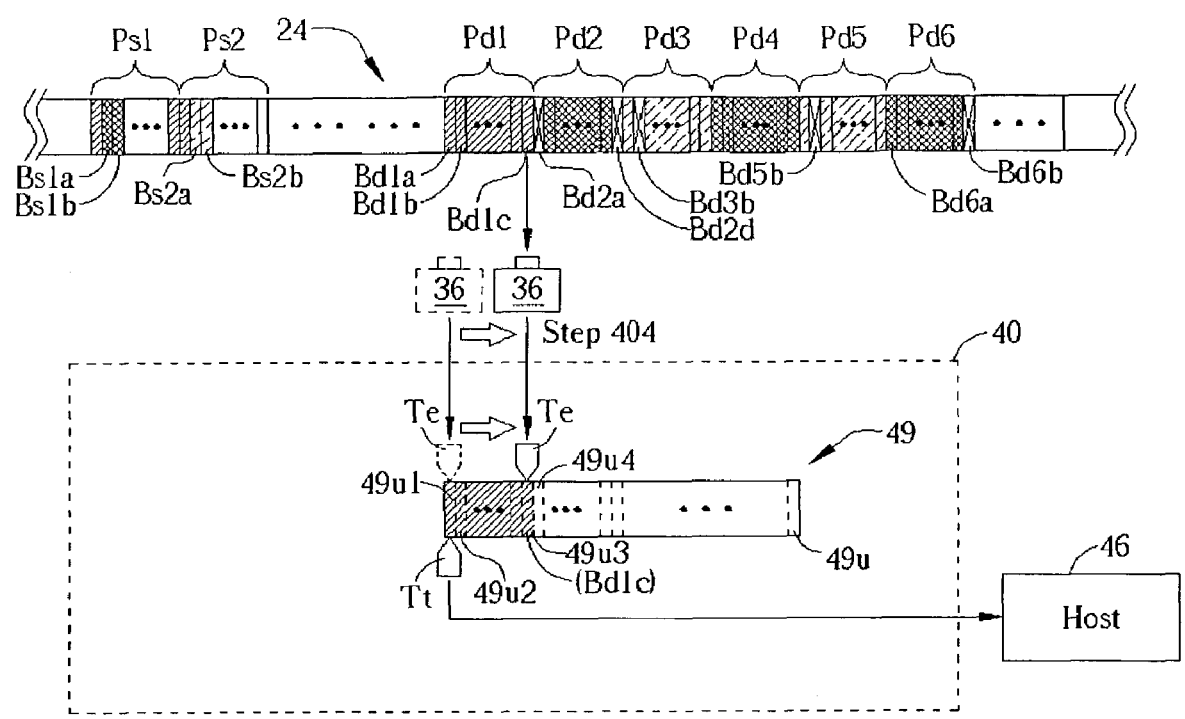

For more information on the data reading process 400 of the present invention, please refer to FIG. 11A to FIG. 11K (and also FIG. 7 and FIG. 10). FIG. 11A to FIG. 11K illustrate an example of related data allocation in the track 24 and the memory 40 during the steps of the process 400. As shown in FIG. 11A, when the process 400 begins, a memory space 49 with fixed memory capacity is allocated in the memory 40. This memory space is used to temporarily store data read from the optical disk by the optical disk drive 30. The memory space 49 has a plurality of memory units $49u$ (for simplified discussion, four memory units $49u1$ to $49u4$ are indicated), each memory unit is used to temporarily store one data entry from a memory block. Similarly, the read pointer Td in FIG. 6A to FIG. 6D points to the memory unit used to temporarily store the data read by the pickup head 36, and memory units with data to transfer to the host 26 are pointed to by the transfer pointer Tc. As described above, a read pointer Te is used to indicate the read progress of the pickup head 36. The transfer pointer Tt is used to indicate the progress of data transfer from the memory space 49 to the host 46. When the process 400 begins, supposing that the host 46 requests the optical disk drive 30 to read data in the data packets Pd1 to Pd6 on track 24, the pickup head 36 moves to the corresponding position of data packet area Pd1 and reads data blocks in the data packet Pd1 (such as data blocks Bd1$a$, Bd1$b$, and Bd1$c$ in FIG. 11A) into the memory 40. As the pickup head reads the data in the data blocks, the read pointer Te sequentially points to different memory units, and stores the data read to these different memory units. For example, data from the data block Bd1$a$ is stored in the memory unit $49u1$, data from the data block Bd1$b$ is stored in the memory unit $49u2$, etc (see step 404). In FIG. 11A, the optical disk drive 30 has not yet begun transferring data read from the memory space 49 to the host 46, so the transfer pointer Tt still points to the original memory unit $49u1$.

Figure 11B:
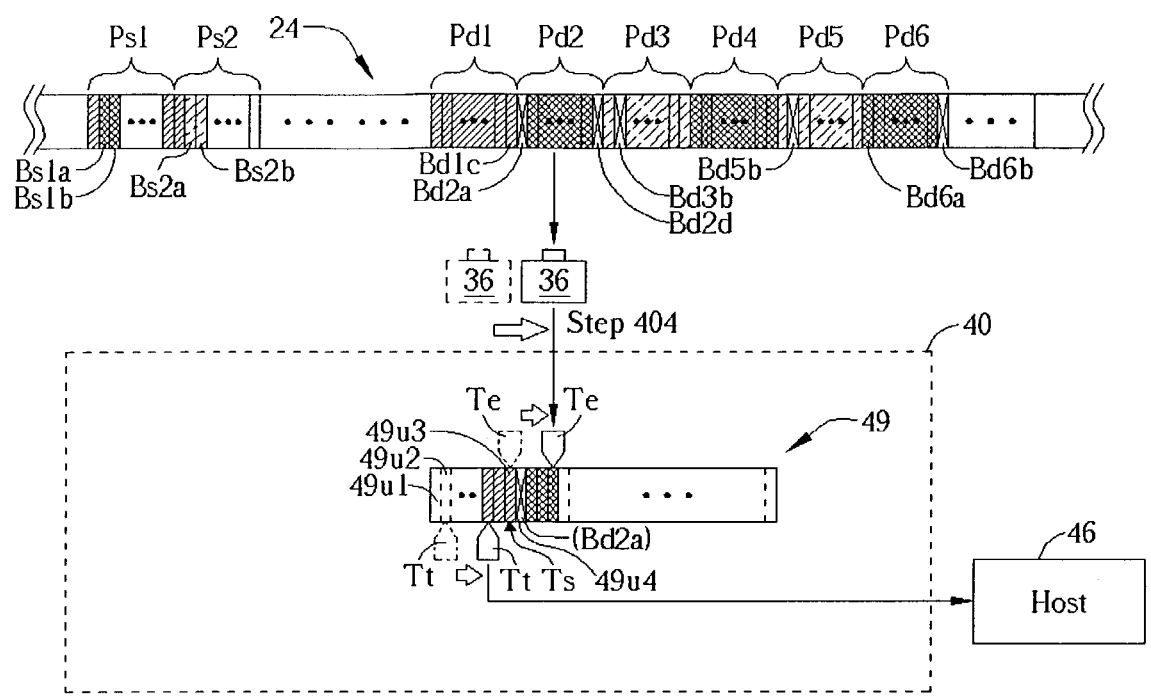

When the process 400 reaches the stage shown in FIG. 11B, the optical disk drive 30 has already transferred data temporarily stored in the memory space 49 to the host 46. As the transfer pointer Tt points to different memory units, data in these memory units will be transferred to the host 46. When the transfer pointer Tt points to the memory unit $49u1$, the data read from data block Bd1$a$ in the memory unit $49u1$ is transferred to the host 46 (please also refer to FIG. 11A). Then, the transfer pointer Tt points to the next memory unit $49u2$, and the data read from the data block BD1$b$ is transferred to host 46, and so on. The memory unit temporarily storing data that has been transferred can be released, so its content can be overwritten by other data. As shown in FIG. 11B, when the transfer pointer Tt indicates the progress goes beyond the memory units $49u1$, $49u2$, the data in the memory units $49u1$, $49u2$ has been transferred to the host 46 and memory units $49u1$, $49u2$ can be released. Of course, during data transfer into the host 46, the pickup head 36 continuously reads data from the data blocks on track 24, and follows the advance of read pointer Te to sequentially read data storing the data in different memory units. Supposing there are two defect data blocks in the data packet Pd2, when the process 400 reaches the step 406 and encounters the defect data block Bd2$a$ (the first defect data block encountered after the process 400 has started), the stop pointer Ts is set in step 408. Because the defect data block Bd2*a* is temporarily stored in the memory unit 49*u*4, the stop pointer Ts points to the memory unit 49*u*3, that is, one memory unit ahead of the memory unit 49*u*4. Please note, as shown in FIG. 11B, even though the process 400 encounters defect data block Bd2*a*, it will not suspend further data reading. Of course, the data block Bd2*a* is a defect data block, so the data read into the memory unit 49*u*4 is erroneous. Before the transfer pointer Tt reaches the stop pointer Ts (i.e. the transfer pointer Tt and stop pointer Ts point to different memory units), transfer pointer Tt keeps on advancing, and continues to transfer data from the memory space 49 into the host 46.

Figure 11C:
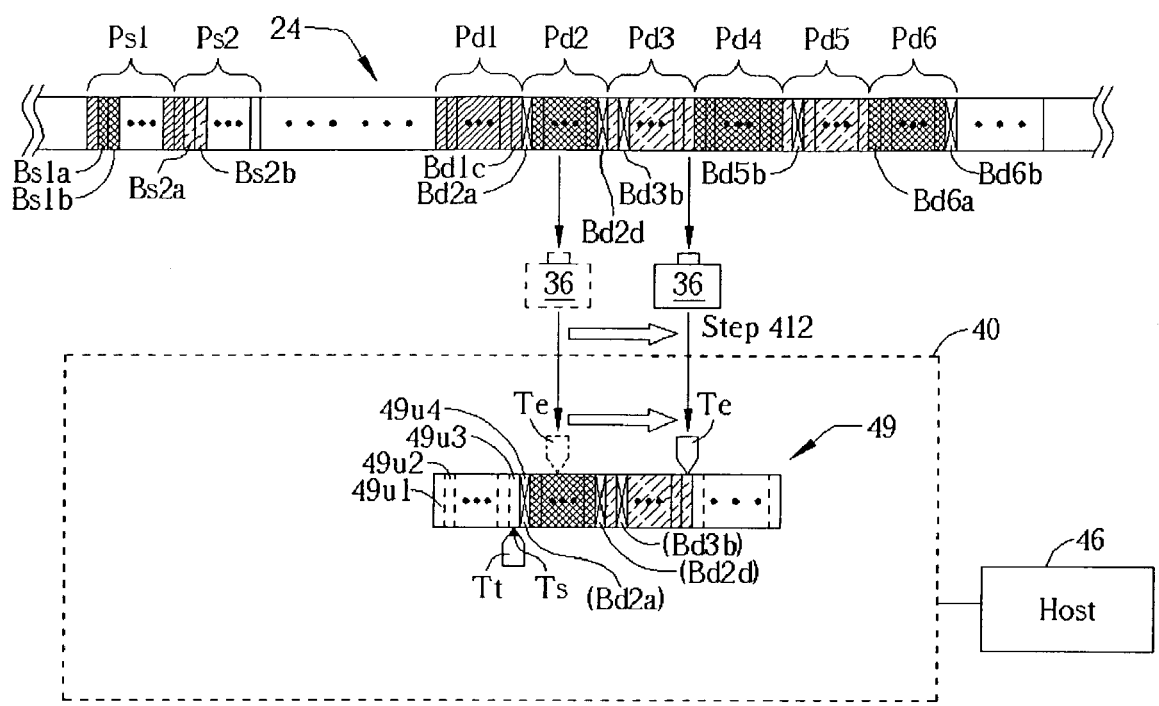

In FIG. 11C, progress of the process 400 has made transfer pointer Tt and stop pointer Ts the same, both pointing to the memory unit 49*u*3. After the optical disk drive 30 transfers data to the memory unit 49*u*3 that was read from the data block Bd1*c* into the host 46, further data transfer is suspended, and the transfer pointer Tt stops advancing. That is, because the next memory unit 49*u*4 stores data read from the defect data block Bd2*a* and as the content is not correct, before the defect is management performed and the correct data is acquired, data in the memory unit 49*u*4 (and the memory units beyond) cannot be transferred to host 46. However, the process 400 still proceeds with step 412, and follows the advance of the read pointer Te to read data into different memory units. As shown in FIG. 11C, even though the process 400 encounters two other defect data blocks Bd2*d*, Bd3*b* during the data read process, it will not suspend the continuous data read process. Accordingly, the stop pointer Ts that is set after the first defect data block Bd1*a* is encountered, will be fixed and point to the memory unit 49*u*3.

Figure 11D:
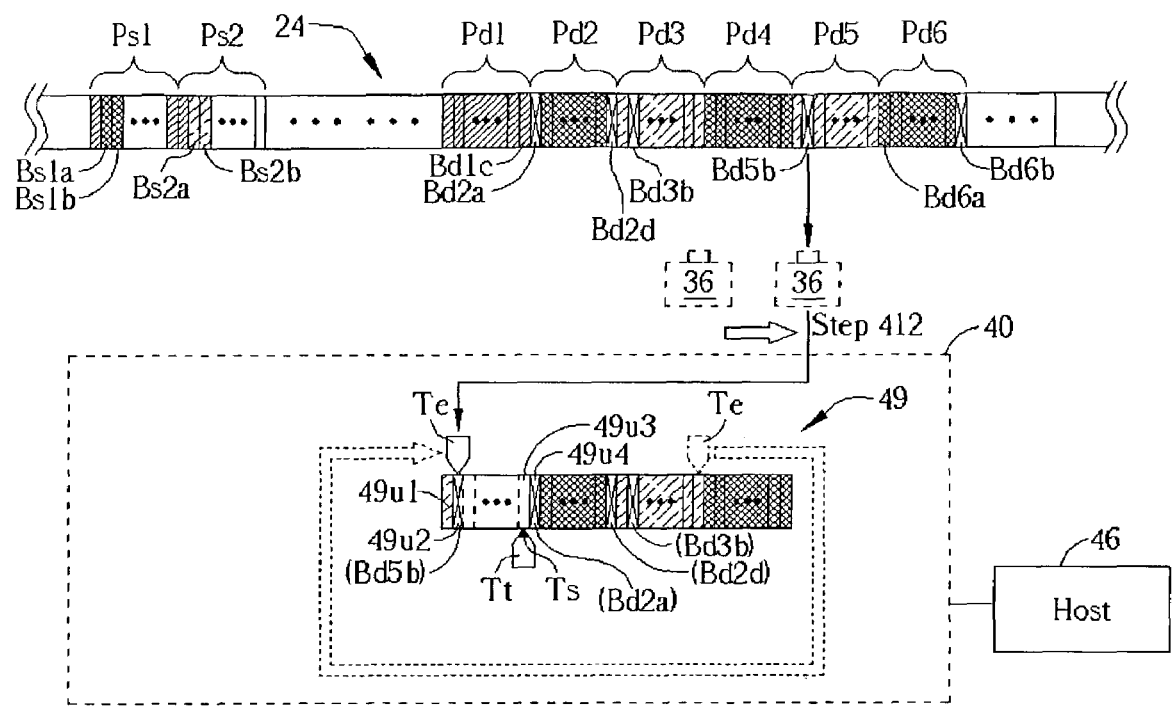
Figure 11E:
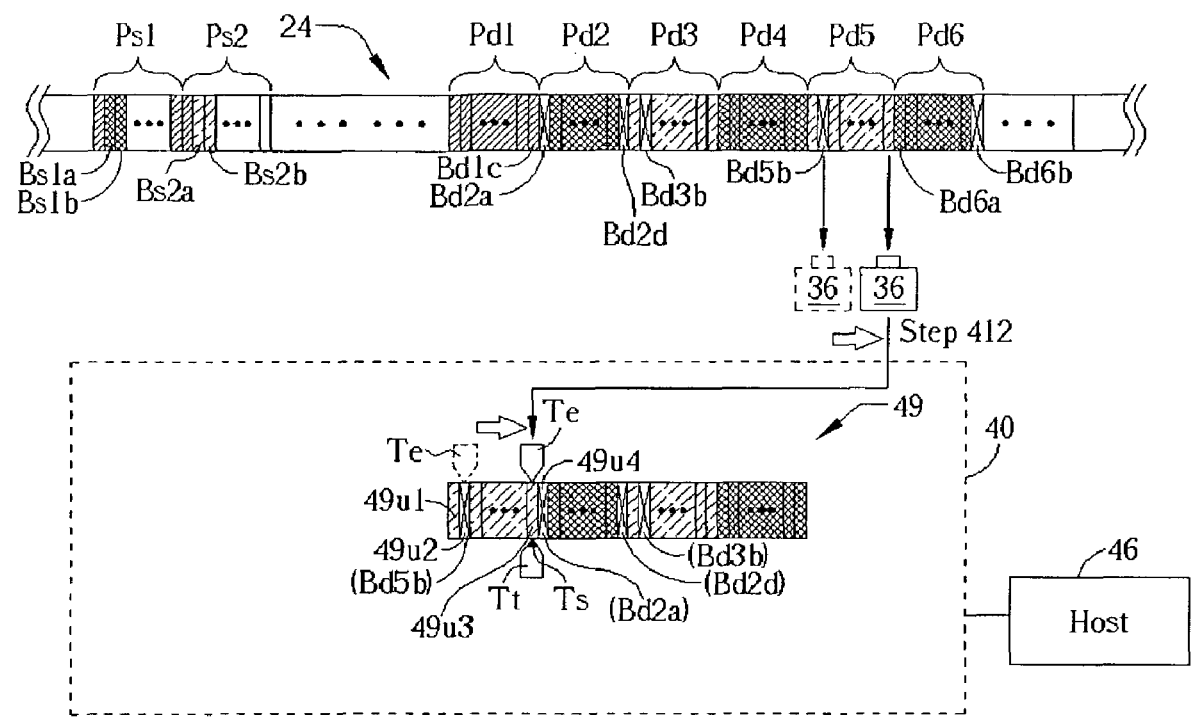
Figure 11F:
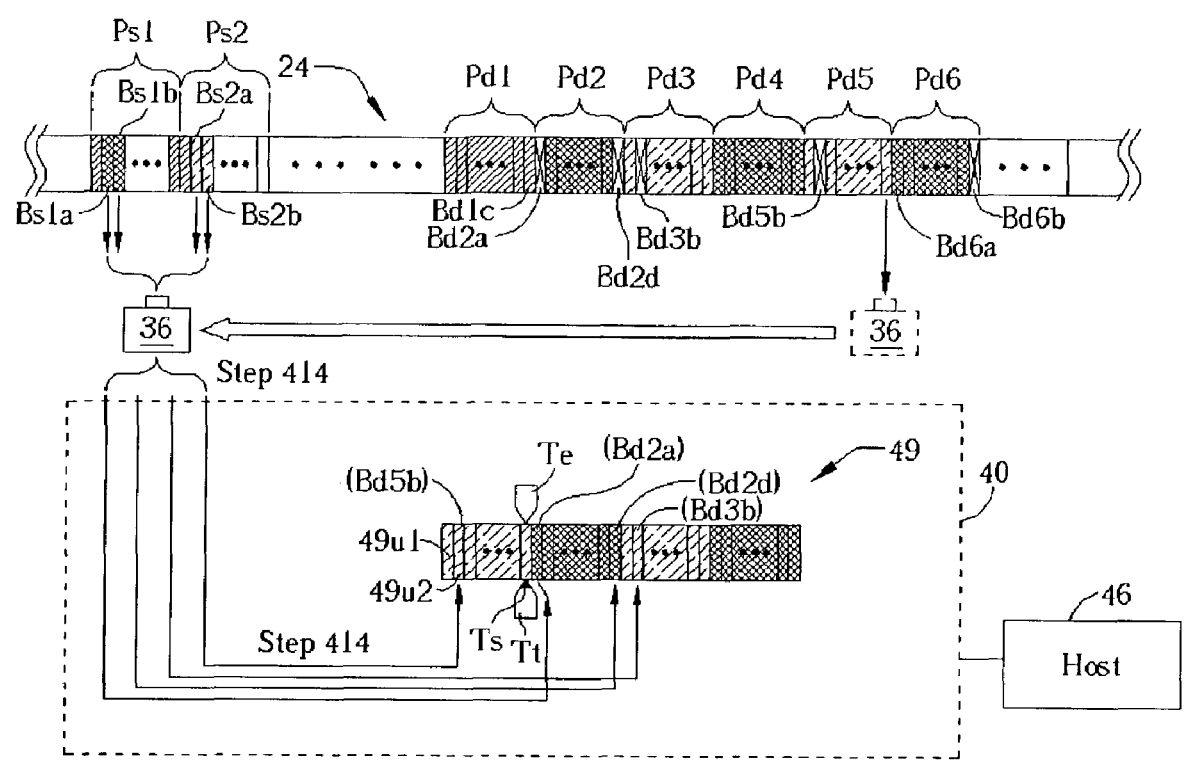
Figure 11G:
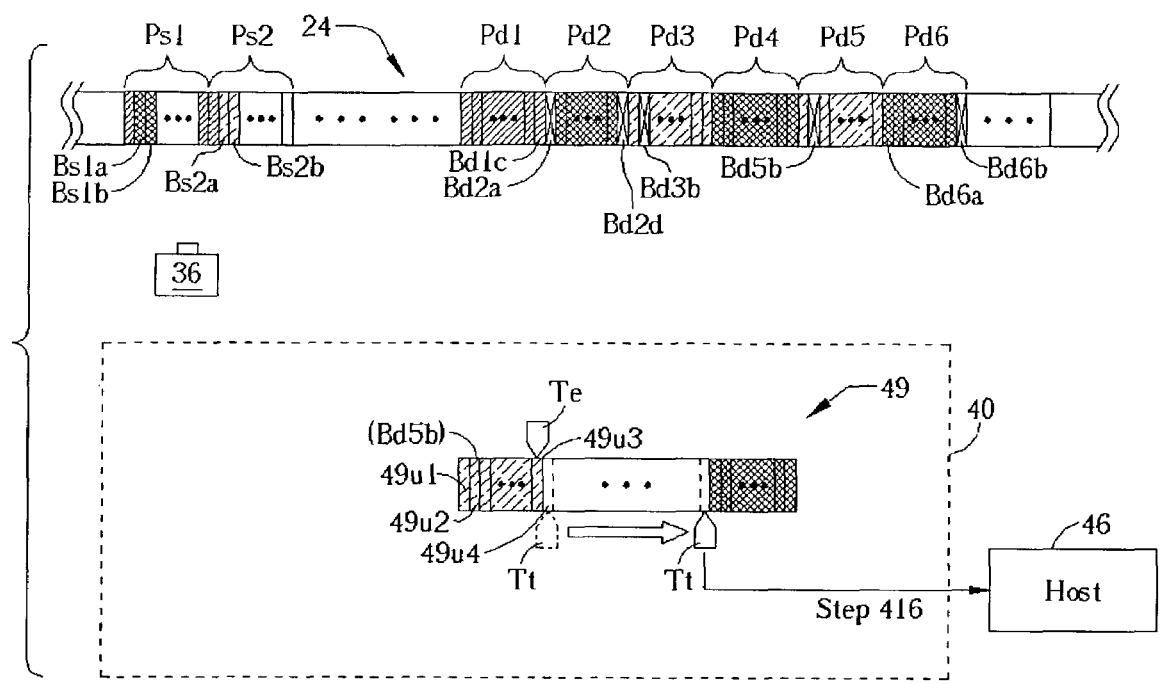
Figure 11H:
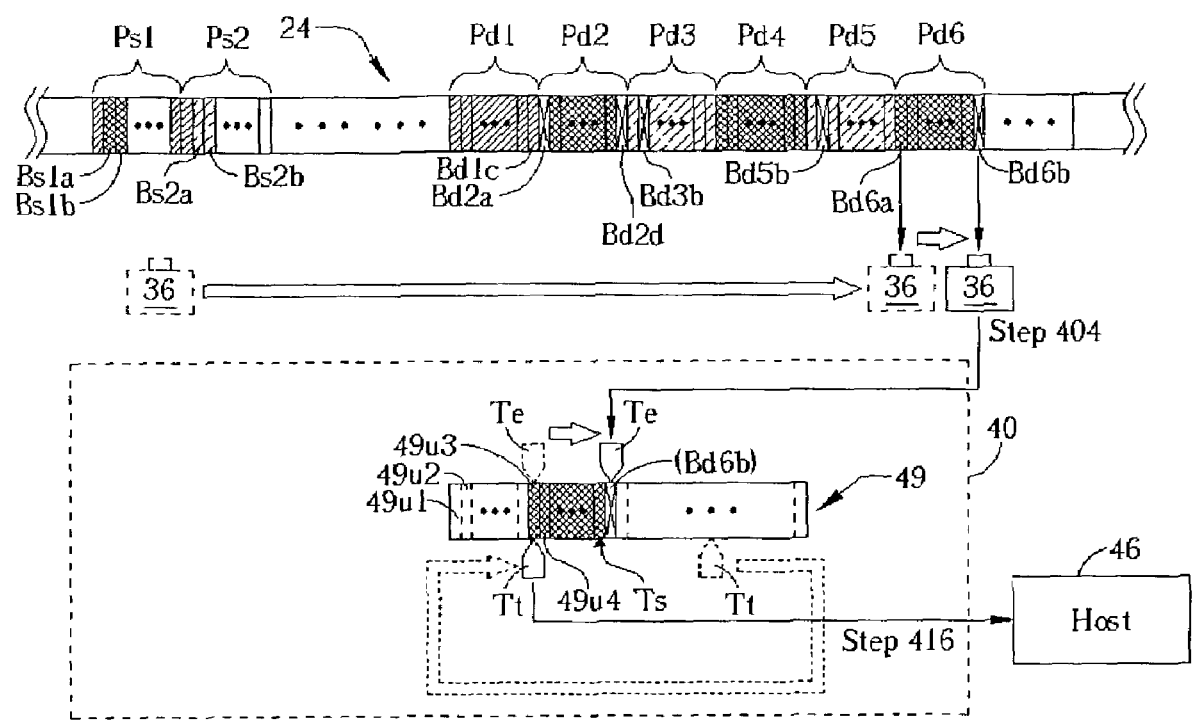
Figure 111:
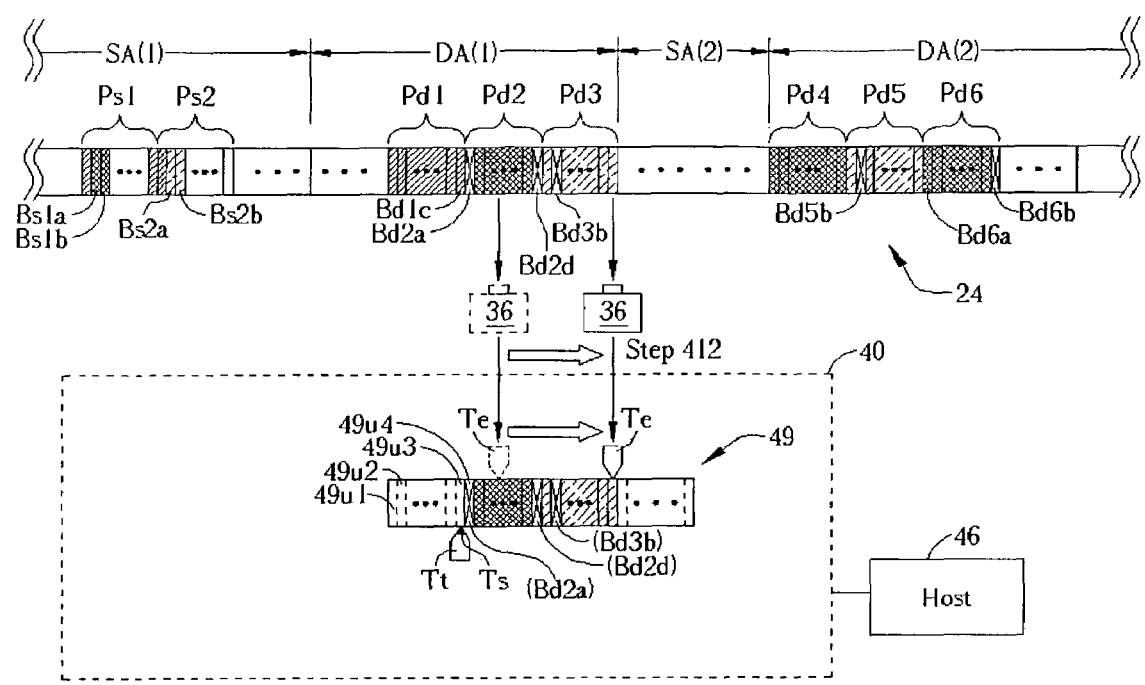

As shown in FIG. 11D, the present invention also uses a cyclic and sequential format to recycle the released memory units in the memory space 49. Thus, the pickup head 36 can read data from the data packet Pd5 and overwrite the memory units 49*u*1, 49*u*2, etc. Please note, because the content has not yet been transferred to the host 46, the memory units beyond 49*u*3 cannot be released yet. In FIG. 11E, as the process 400 keeps on reading data into the memory space 49, the read pointer Te also keeps on advancing, until finally the read pointer Te coincides with the stop pointer Ts (and the transfer pointer Tt), which all point to the same memory space 49*u*3. At this point, the stop condition in step 410 is fulfilled, so the process 400 can proceed to step 414 and perform defect management. If the read pointer Te keeps on advancing again, the data read overwrites the next memory unit 49*u*4 incorrectly, and further data reading must first be interrupted to perform defect management. As shown in FIG. 11E, the process 400 accumulates four defect data blocks Bd2*a*, Bd2*d*, Bd3*b*, and Bd5*b* during the process, and no defect management is performed yet. Suppose that the spare blocks that are used to substitute for these four defect data block to record data are scattered as spare blocks Bs1*a*, Bs1*b*, Bs2*a*, Bs2*b* in the spare packets Ps1, Ps2. Thus, in FIG. 11F, the pickup head 36 seeks to the corresponding positions in the spare packets Ps1, Ps2, reads data from these spare blocks, and stores it in the corresponding memory units in the memory space 49. For instance, data in the spare block Bs1*a* that is used to substitute for the defect data block Bd1*a* is read into the memory unit 49*u*4. After finishing defect management, the optical disk drive 30 can fully acquire data that the host 46 requested, and reset the stop pointer Ts. In FIG. 11G the transfer pointer Tt starts to advance again, allowing transfer of data requested by the host 46 to the host 46. As shown in FIG. 11H, after the transfer pointer Tt follows the cyclic sequence to advance and transfer data from the memory space 49 back to the host 46, the pickup head 36 can seek back to where it was interrupted to continue further data reading. In this example, the pickup head 36 keeps on reading data from the data packet Pd6, and if the data packet Pd6 has one defect data block Bd6*b*, the process 400 resets the stop pointer again, referencing the memory unit that temporarily stores the defect data block Bd6*b* to determine the memory unit pointed to by stop pointer, as shown in FIG. 11H.

Figure 1:
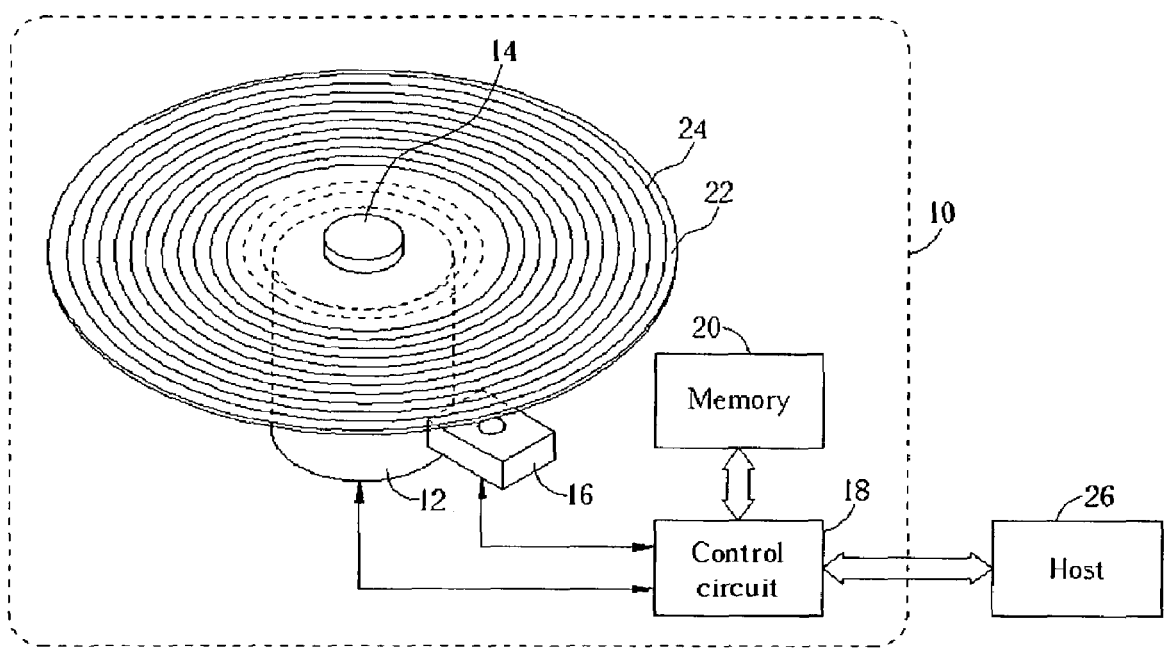
FIG. 1 is a functional block diagram of a typical optical disk drive.
Figure 11J:
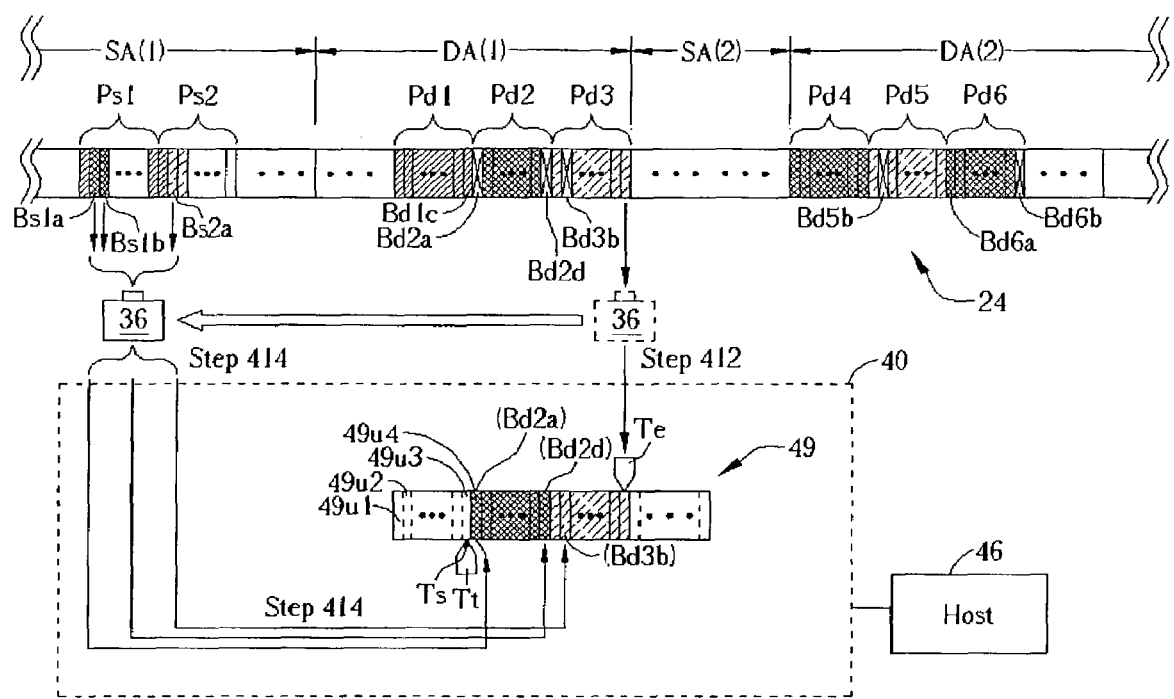
Figure 11K:
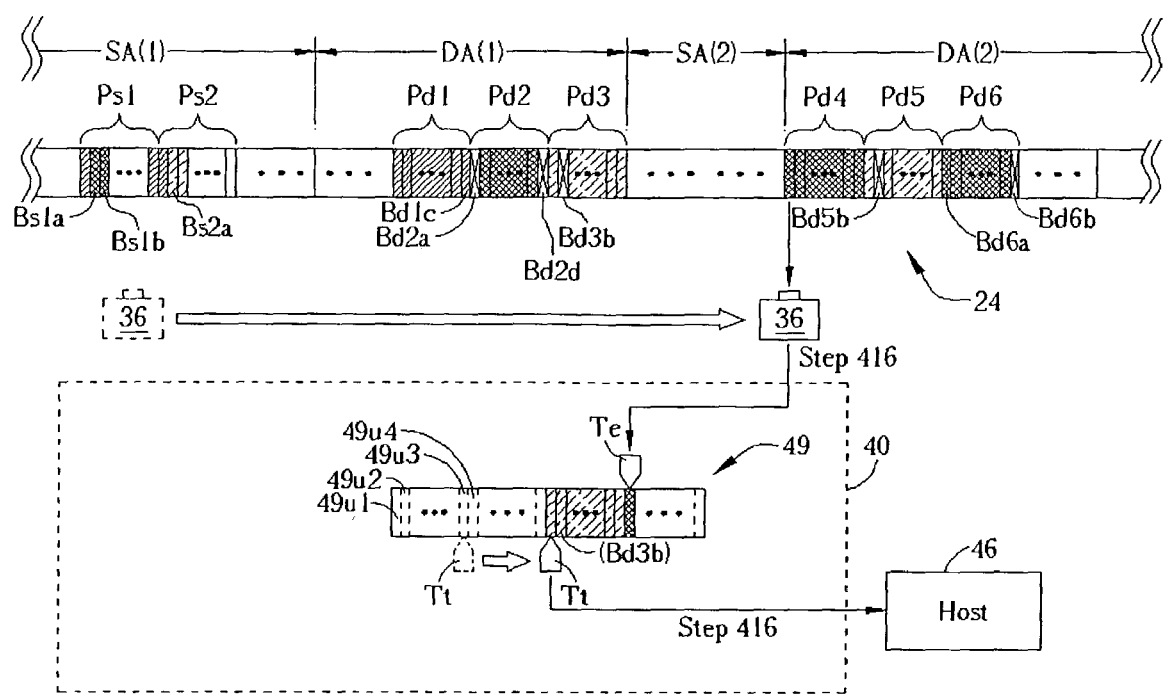

As described above, if the pickup head 36 must seek across the spare area for continuous data reading during the data read process 400, then defect management can be performed before the seek operation. Please refer to FIG. 11I. Suppose that in continuing the read process in FIG. 11C, in FIG. 11I, the pickup head 36 starts to continue reading data from the data packet Pd4 after the packet Pd3 was read. However, in FIG. 11I, the packets Pd3 and Pd4 belong to different data areas DA(1), DA (2), and the pickup head 36 must cross the spare area SA(2) between these two data areas to reach the data area DA(2) in order to perform data reading. Since the pickup head 36 must perform this seek operation anyway, defect management can be performed at the same time. As shown in FIG. 11J, before the pickup head 36 moves to the corresponding position of the packet Pd4, the process 400 starts to perform defect management from step 410 to step 414. Consider this example; the process 400 accumulates three defect data blocks (Bd2*a*, Bd2*d* and Bd3*d*) without performing defect management along the way. Referring to the example of FIG. 11F, in FIG. 1J, the pickup head also reads the spare blocks (Bs2*a*, Bs1*b* and Bs2*a*) that are used to substitute for these three defect data blocks into memory space 29, and acquires all data that the host 46 requested. In FIG. 11K, the data transfer that was suspended can now transfer back all data to the host 46, and the transfer pointer Tt can also advance again. Finally, the pickup head 36 seeks to the corresponding position of the packet Pd4, and follows the advance of the read pointer Te to continue further data reading. Additionally, the stop pointer Ti should also be reset.

From the above description, the optical disk data reading process 400 according to the present invention suspends defect management for defect data blocks encountered during the data read process, waiting until the stop condition is fulfilled before performing all defect management needed at once. Examples in FIG. 11A to FIG. 11H show that the process only performs data reading on the spare area once (FIG. 11F, FIG. 11H), and that four defect management sequences for defect data are performed at the same time. In this way, interruption caused by defect management during the data reading process and mechanical operation burdens of the optical disk drive 46 can be minimized, the efficiency of the read process being enhanced. As for the stop condition in the present invention, in one way, it can set a boundary among memory units for data to be overwritten, and can manage memory space 49 effectively and extend the continuous flow for the data reading process before defect management is performed. On the other hand, the present invention stop condition allows defect management to be performed when the pickup head is required to seek across defect blocks, thus minimizing the travel distance of the pickup head 36.

In conclusion, in the prior art optical disk data reading or data writing processes, whenever one defect data block encountered, corresponding defect management is performed immediately. When a plurality of defect data blocks are encountered, the prior art performs frequent seek operations in order to manage these defect data blocks. This not only increases burden to the optical disk drive operation, but also lowers the efficiency for optical disk data access. In comparison, the present invention suspends defect management for defect data blocks encountered during the data access period to maintain continuous flow of data access, and waits until the stop condition is fulfilled before performing defect management for all defect data blocks accumulated so far. In this way, the pickup head 36 does not need to frequently seek and physically move because of defect management, mechanical operations can be minimized and efficiency of the optical disk data access enhanced. Additionally, the stop condition of the present invention can utilize memory space effectively, extending the continuous flow for the data access process, and allow defect management to be performed when the pickup head has to seek across tracks during the data access period. Not only can the efficiency of data access can be maintained, but defect management can be performed effectively with both speed and accuracy.

Described above is only the preferred embodiment of the present invention. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for writing data onto an optical disk with a drive, the drive comprising a memory for storing data transmitted from a host, the drive capable of writing the data stored in the memory onto the optical disk, the optical disk comprising a plurality of data blocks and a plurality of spare blocks, each of the data blocks being used for storing data, and each of the spare blocks being used for replacing a defect data block to store data, the method comprising:

writing a first data to a space in the memory corresponding to a defect data block, suspending transmission of the first data and subsequent data to the optical disk, successively writing a predetermined number of data to the memory, then writing the first data in the spare block for replacing data that is supposed to be recorded in the location of the defect data block; wherein the predetermined number is determined by a memory capacity of the memory.

2. The method of claim 1 further comprising:

when a second data of the predetermined number of data is written in a second space in the memory corresponding to a second defect data block, the second data is written to the spare block for replacing the second defect data block immediately after the first data is written to the spare block for replacing the defect data block.

3. The method of claim 1 wherein the memory is capable of storing a first number of data and the predetermined number is less than the first number by one.

4. The method of claim 3 further comprising:

when a second data is written to a space in the memory corresponding to a second defect data block, the second data is written to the spare block for replacing the second defect data block immediately after the first data is written to the spare block for replacing the defect data block.

5. A method for writing data onto an optical disk with a drive, the drive comprising a memory for storing data transmitted from a host, and the drive capable of writing the data stored in the memory onto the optical disk, the optical disk comprising a plurality of data blocks and a plurality of spare blocks, each of the data blocks being used for recording data and each of the spare blocks being used for replacing a defect data block to record data, the method comprising:

writing a plurality of data to a plurality of spaces respectively in the memory; and writing a first data to a space in the memory corresponding to a defect data block, suspending transmission of the first data and subsequent data to the optical disk, writing the plurality of data in the plurality of spaces in the memory prior to the space in the memory to other data blocks of the optical disk until being adjacent to a spare block, then writing the first data in the spare block for replacing the defect data block.

6. A method for writing data onto an optical disk with a drive, the drive comprising a memory for storing data transmitted from a host, the drive capable of writing the data stored in the memory onto the optical disk, the optical disk comprising a plurality of data blocks and a plurality of spare blocks, each of the data blocks being used for storing data, and each of the spare blocks being used for replacing a defect data block to store data, the method comprising:

writing a first data to a space in the memory corresponding to a defect data block, suspending transmission of the first data and subsequent data to the optical disk, successively writing a predetermined number of data to the memory, then writing the first data in the spare block for replacing data that is supposed to be recorded in the location of the defect data block; wherein the predetermined number is determined by a memory capacity of the memory;

wherein when a second data of the predetermined number of data is written in a second space in the memory corresponding to a second defect data block, the second data is written to the spare block for replacing the second defect data block immediately after the first data is written to the spare block for replacing the defect data block.

7. A method for writing data onto an optical disk with a drive, the drive comprising a memory for storing data transmitted from a host, and the drive capable of writing the data stored in the memory onto the optical disk, the optical disk comprising a plurality of data blocks and a plurality of spare blocks, each of the data blocks being used for recording data and each of the spare blocks being used for replacing a defect data block to record data, the method comprising:

writing a first data to a space in the memory corresponding to a defect data block, suspending transmission of the first data and subsequent data to the optical disk, writing data of the memory prior to the space in the memory to other data blocks of the optical disk until being adjacent to a spare block, then writing the first data in the spare block for replacing the defect data block;

wherein when a second data is written to a space in the memory corresponding to a second defect data block, the second data is written to the spare block for replacing the second defect data block immediately after the first data is written to the spare block for replacing the defect data block.

* * * * *